(12) United States Patent
Yeung et al.

(10) Patent No.: US 11,560,848 B2
(45) Date of Patent: *Jan. 24, 2023

(54) METHODS FOR NOISE DAMPENING AND ATTENUATION OF TURBINE ENGINE

(71) Applicant: BJ Energy Solutions, LLC, Houston, TX (US)

(72) Inventors: Tony Yeung, Houston, TX (US); Ricardo Rodriguez-Ramon, Houston, TX (US); Heber Martinez-Barron, Houston, TX (US)

(73) Assignee: BJ Energy Solutions, LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/502,120

(22) Filed: Oct. 15, 2021

(65) Prior Publication Data
US 2022/0220898 A1    Jul. 14, 2022

Related U.S. Application Data

(63) Continuation of application No. 17/498,916, filed on Oct. 12, 2021, which is a continuation of application
(Continued)

(51) Int. Cl.
*F02C 7/24* (2006.01)
*F01D 25/30* (2006.01)
*F02C 6/00* (2006.01)

(52) U.S. Cl.
CPC ................ *F02C 7/24* (2013.01); *F01D 25/30* (2013.01); *F02C 6/00* (2013.01); *F05D 2220/32* (2013.01);
(Continued)

(58) Field of Classification Search
CPC .... F02C 6/00; F02C 7/045; F02C 7/24; F01D 25/30; B60P 3/00; H02K 7/1823
See application file for complete search history.

(56) References Cited

U.S. PATENT DOCUMENTS 1,716,049 A    6/1929    Greve
1,726,633 A    9/1929    Smith
(Continued)

FOREIGN PATENT DOCUMENTS

CA    2737321    9/2013
CA    2964597    10/2017
(Continued)

OTHER PUBLICATIONS

US 11,459,865 B2, 10/2022, Cui et al. (withdrawn)
(Continued)

*Primary Examiner* — Arun Goyal
(74) *Attorney, Agent, or Firm* — Womble Bond Dickinson (US) LLP

(57) ABSTRACT

A method to attenuate noise associated with operation of a gas turbine engine during a fracturing operation may include connecting an inlet of a first elongated plenum to an exhaust duct of the gas turbine engine. The method further may include connecting a noise attenuator to a distal end of the first elongated plenum. The noise attenuator may include first and second silencer hoods. The method also may include pivoting the first and second silencer hoods from stowed positions to operative positions so that the second silencer hood in combination with the first silencer hood define a second elongated plenum positioned to receive exhaust gas via the first elongated plenum and the exhaust duct. The first elongated plenum and the second elongated
(Continued)

plenum may increase an effective length of the exhaust duct and may reduce sound emission associated with operation of the gas turbine engine.

25 Claims, 6 Drawing Sheets

Related U.S. Application Data

No. 17/182,325, filed on Feb. 23, 2021, now Pat. No. 11,242,802, which is a continuation of application No. 16/948,290, filed on Sep. 11, 2020, now Pat. No. 10,961,914.

(60) Provisional application No. 62/704,567, filed on May 15, 2020, provisional application No. 62/899,957, filed on Sep. 13, 2019.

(52) U.S. Cl.
CPC .. *F05D 2220/70* (2013.01); *F05D 2260/4031* (2013.01)

(56) References Cited

U.S. PATENT DOCUMENTS

| | | | |
|---|---|---|---|
| 2,178,662 A | 11/1939 | Lars | |
| 2,427,638 A | 9/1947 | Vilter | |
| 2,498,229 A | 2/1950 | Adler | |
| 2,535,703 A | 12/1950 | Smith et al. | |
| 2,572,711 A | 10/1951 | Fischer | |
| 2,820,341 A | 1/1958 | Amann | |
| 2,868,004 A | 1/1959 | Runde | |
| 2,940,377 A | 6/1960 | Darnell et al. | |
| 2,947,141 A | 8/1960 | Russ | |
| 2,956,738 A | 10/1960 | Rosenschold | |
| 3,068,796 A | 12/1962 | Pfluger et al. | |
| 3,191,517 A | 6/1965 | Solzman | |
| 3,257,031 A | 6/1966 | Dietz | |
| 3,274,768 A | 9/1966 | Klein | |
| 3,378,074 A | 4/1968 | Kiel | |
| 3,382,671 A * | 5/1968 | Ehni, III | H02P 23/16 |
| | | | 60/790 |
| 3,401,873 A | 9/1968 | Privon | |
| 3,463,612 A | 8/1969 | Whitsel | |
| 3,496,880 A | 2/1970 | Wolff | |
| 3,550,696 A | 12/1970 | Kenneday | |
| 3,586,459 A | 6/1971 | Zerlauth | |
| 3,632,222 A | 1/1972 | Cronstedt | |
| 3,656,582 A | 4/1972 | Alcock | |
| 3,667,868 A | 6/1972 | Brunner | |
| 3,692,434 A | 9/1972 | Schnear | |
| 3,739,872 A | 6/1973 | McNair | |
| 3,757,581 A | 9/1973 | Mankin | |
| 3,759,063 A | 9/1973 | Bendall | |
| 3,765,173 A | 10/1973 | Harris | |
| 3,771,916 A | 11/1973 | Flanigan et al. | |
| 3,773,438 A | 11/1973 | Hall et al. | |
| 3,786,835 A | 1/1974 | Finger | |
| 3,791,682 A | 2/1974 | Mitchell | |
| 3,796,045 A | 3/1974 | Foster | |
| 3,814,549 A | 6/1974 | Cronstedt | |
| 3,820,922 A | 6/1974 | Buse et al. | |
| 3,847,511 A | 11/1974 | Cole | |
| 3,963,372 A * | 6/1976 | McLain | B64C 27/14 |
| | | | 60/39.15 |
| 4,010,613 A | 3/1977 | McInerney | |
| 4,019,477 A | 4/1977 | Overton | |
| 4,031,407 A | 6/1977 | Reed | |
| 4,050,862 A | 9/1977 | Buse | |
| 4,059,045 A | 11/1977 | McClain | |
| 4,086,976 A | 5/1978 | Holm et al. | |
| 4,117,342 A | 9/1978 | Melley, Jr. | |
| 4,173,121 A | 11/1979 | Yu | |
| 4,204,808 A | 5/1980 | Reese et al. | |
| 4,209,079 A | 6/1980 | Marchal et al. | |
| 4,209,979 A | 7/1980 | Woodhouse et al. | |
| 4,222,229 A | 9/1980 | Uram | |
| 4,269,569 A | 5/1981 | Hoover | |
| 4,311,395 A | 1/1982 | Douthitt et al. | |
| 4,330,237 A | 5/1982 | Battah | |
| 4,341,508 A | 7/1982 | Rambin, Jr. | |
| 4,357,027 A | 11/1982 | Zeitlow | |
| 4,383,478 A | 5/1983 | Jones | |
| 4,402,504 A | 9/1983 | Christian | |
| 4,430,047 A | 2/1984 | Ilg | |
| 4,457,325 A | 7/1984 | Green | |
| 4,470,771 A | 9/1984 | Hall et al. | |
| 4,483,684 A | 11/1984 | Black | |
| 4,505,650 A | 3/1985 | Hannett et al. | |
| 4,574,880 A | 3/1986 | Handke | |
| 4,584,654 A | 4/1986 | Crane | |
| 4,620,330 A | 11/1986 | Izzi, Sr. | |
| 4,672,813 A | 6/1987 | David | |
| 4,754,607 A | 7/1988 | Mackay | |
| 4,782,244 A | 11/1988 | Wakimoto | |
| 4,796,777 A | 1/1989 | Keller | |
| 4,869,209 A | 9/1989 | Young | |
| 4,913,625 A | 4/1990 | Gerlowski | |
| 4,983,259 A | 1/1991 | Duncan | |
| 4,990,058 A | 2/1991 | Eslinger | |
| 5,032,065 A | 7/1991 | Yamamuro | |
| 5,135,361 A | 8/1992 | Dion | |
| 5,167,493 A | 12/1992 | Kobari | |
| 5,245,970 A | 9/1993 | Iwaszkiewicz et al. | |
| 5,291,842 A | 3/1994 | Sallstrom et al. | |
| 5,326,231 A | 7/1994 | Pandeya | |
| 5,362,219 A | 11/1994 | Paul et al. | |
| 5,511,956 A | 4/1996 | Hasegawa | |
| 5,537,813 A | 7/1996 | Davis et al. | |
| 5,553,514 A | 9/1996 | Walkowc | |
| 5,560,195 A | 10/1996 | Anderson et al. | |
| 5,586,444 A | 12/1996 | Fung | |
| 5,622,245 A | 4/1997 | Reik | |
| 5,626,103 A | 5/1997 | Haws et al. | |
| 5,634,777 A | 6/1997 | Albertin | |
| 5,651,400 A | 7/1997 | Corts et al. | |
| 5,678,460 A | 10/1997 | Walkowc | |
| 5,717,172 A | 2/1998 | Griffin, Jr. et al. | |
| 5,720,598 A | 2/1998 | de Chizzelle | |
| 5,839,888 A | 11/1998 | Harrison | |
| 5,846,062 A | 12/1998 | Yanagisawa et al. | |
| 5,875,744 A | 3/1999 | Vallejos | |
| 5,983,962 A | 11/1999 | Gerardot | |
| 5,992,944 A | 11/1999 | Hara | |
| 6,041,856 A | 3/2000 | Thrasher et al. | |
| 6,050,080 A | 4/2000 | Horner | |
| 6,067,962 A | 5/2000 | Bartley et al. | |
| 6,071,188 A | 6/2000 | O'Neill et al. | |
| 6,074,170 A | 6/2000 | Bert et al. | |
| 6,123,751 A | 9/2000 | Nelson et al. | |
| 6,129,335 A | 10/2000 | Yokogi | |
| 6,145,318 A | 11/2000 | Kaplan et al. | |
| 6,230,481 B1 | 5/2001 | Jahr | |
| 6,279,309 B1 | 8/2001 | Lawlor, II et al. | |
| 6,321,860 B1 | 11/2001 | Reddoch | |
| 6,334,746 B1 | 1/2002 | Nguyen et al. | |
| 6,401,472 B2 | 6/2002 | Pollrich | |
| 6,530,224 B1 | 3/2003 | Conchieri | |
| 6,543,395 B2 | 4/2003 | Green | |
| 6,655,922 B1 | 12/2003 | Flek | |
| 6,669,453 B1 | 12/2003 | Breeden | |
| 6,765,304 B2 | 7/2004 | Baten et al. | |
| 6,786,051 B2 | 9/2004 | Kristich et al. | |
| 6,832,900 B2 | 12/2004 | Leu | |
| 6,851,514 B2 | 2/2005 | Han et al. | |
| 6,859,740 B2 | 2/2005 | Stephenson et al. | |
| 6,901,735 B2 | 6/2005 | Lohn | |
| 6,962,057 B2 | 11/2005 | Kurokawa et al. | |
| 7,007,966 B2 | 3/2006 | Campion | |
| 7,047,747 B2 | 5/2006 | Tanaka | |
| 7,065,953 B1 | 6/2006 | Kopko | |
| 7,143,016 B1 | 11/2006 | Discenzo et al. | |

(56) References Cited

U.S. PATENT DOCUMENTS

| | | |
|---|---|---|
| 7,222,015 B2 | 5/2007 | Davis et al. |
| 7,281,519 B2 | 10/2007 | Schroeder |
| 7,388,303 B2 | 6/2008 | Seiver |
| 7,404,294 B2 | 7/2008 | Sundin |
| 7,442,239 B2 | 10/2008 | Armstrong et al. |
| 7,524,173 B2 | 4/2009 | Cummins |
| 7,545,130 B2 | 6/2009 | Latham |
| 7,552,903 B2 | 6/2009 | Dunn et al. |
| 7,563,076 B2 | 7/2009 | Brunet et al. |
| 7,563,413 B2 | 7/2009 | Naets et al. |
| 7,574,325 B2 | 8/2009 | Dykstra |
| 7,594,424 B2 | 9/2009 | Fazekas |
| 7,614,239 B2 | 11/2009 | Herzog et al. |
| 7,627,416 B2 | 12/2009 | Batenburg et al. |
| 7,677,316 B2 | 3/2010 | Butler et al. |
| 7,721,521 B2 | 5/2010 | Kunkle et al. |
| 7,730,711 B2 | 6/2010 | Kunkle et al. |
| 7,779,961 B2 | 8/2010 | Matte |
| 7,789,452 B2 | 9/2010 | Dempsey et al. |
| 7,836,949 B2 | 11/2010 | Dykstra |
| 7,841,394 B2 | 11/2010 | McNeel et al. |
| 7,845,413 B2 | 12/2010 | Shampine et al. |
| 7,886,702 B2 | 2/2011 | Jerrell et al. |
| 7,900,724 B2 | 3/2011 | Promersberger et al. |
| 7,921,914 B2 | 4/2011 | Bruins et al. |
| 7,938,151 B2 | 5/2011 | Höckner |
| 7,980,357 B2 | 7/2011 | Edwards |
| 8,056,635 B2 | 11/2011 | Shampine et al. |
| 8,083,504 B2 | 12/2011 | Williams et al. |
| 8,186,334 B2 | 5/2012 | Ooyama |
| 8,196,555 B2 | 6/2012 | Ikeda et al. |
| 8,202,354 B2 | 6/2012 | Iijima |
| 8,316,936 B2 | 11/2012 | Roddy et al. |
| 8,336,631 B2 | 12/2012 | Shampine et al. |
| 8,388,317 B2 | 3/2013 | Sung |
| 8,414,673 B2 | 4/2013 | Raje et al. |
| 8,469,826 B2 | 6/2013 | Brosowske |
| 8,500,215 B2 | 8/2013 | Gastauer |
| 8,506,267 B2 | 8/2013 | Gambier et al. |
| 8,575,873 B2 | 11/2013 | Peterson et al. |
| 8,616,005 B1 | 12/2013 | Cousino, Sr. et al. |
| 8,621,873 B2 | 1/2014 | Robertson et al. |
| 8,641,399 B2 | 2/2014 | Mucibabic |
| 8,656,990 B2 | 2/2014 | Kajaria et al. |
| 8,672,606 B2 | 3/2014 | Glynn et al. |
| 8,707,853 B1 | 4/2014 | Dille et al. |
| 8,714,253 B2 | 5/2014 | Sherwood et al. |
| 8,757,918 B2 | 6/2014 | Ramnarain et al. |
| 8,770,329 B2 | 7/2014 | Spitler |
| 8,784,081 B1 | 7/2014 | Blume |
| 8,789,601 B2 | 7/2014 | Broussard et al. |
| 8,794,307 B2 | 8/2014 | Coquilleau et al. |
| 8,801,394 B2 | 8/2014 | Anderson |
| 8,851,186 B2 | 10/2014 | Shampine et al. |
| 8,851,441 B2 | 10/2014 | Acuna et al. |
| 8,905,056 B2 | 12/2014 | Kendrick |
| 8,951,019 B2 | 2/2015 | Hains et al. |
| 8,973,560 B2 | 3/2015 | Krug |
| 8,997,904 B2 | 4/2015 | Cryer et al. |
| 9,011,111 B2 | 4/2015 | Lesko |
| 9,016,383 B2 | 4/2015 | Shampine et al. |
| 9,032,620 B2 | 5/2015 | Frassinelli et al. |
| 9,057,247 B2 | 6/2015 | Kumar et al. |
| 9,097,249 B2 | 8/2015 | Petersen |
| 9,103,193 B2 | 8/2015 | Coli et al. |
| 9,121,257 B2 | 9/2015 | Coli et al. |
| 9,140,110 B2 | 9/2015 | Coli et al. |
| 9,187,982 B2 | 11/2015 | Dehring et al. |
| 9,206,667 B2 | 12/2015 | Khvoshchev et al. |
| 9,212,643 B2 | 12/2015 | Deliyski |
| 9,222,346 B1 | 12/2015 | Walls |
| 9,324,049 B2 | 4/2016 | Thomeer et al. |
| 9,341,055 B2 | 5/2016 | Weightman et al. |
| 9,346,662 B2 | 5/2016 | Van Vliet et al. |
| 9,366,114 B2 | 6/2016 | Coli et al. |
| 9,376,786 B2 | 6/2016 | Numasawa |
| 9,394,829 B2 | 7/2016 | Cabeen et al. |
| 9,395,049 B2 | 7/2016 | Vicknair et al. |
| 9,401,670 B2 | 7/2016 | Minato et al. |
| 9,410,410 B2 | 8/2016 | Broussard et al. |
| 9,410,546 B2 | 8/2016 | Jaeger et al. |
| 9,429,078 B1 | 8/2016 | Crowe et al. |
| 9,435,333 B2 | 9/2016 | McCoy et al. |
| 9,488,169 B2 | 11/2016 | Cochran et al. |
| 9,493,997 B2 | 11/2016 | Liu et al. |
| 9,512,783 B2 | 12/2016 | Veilleux et al. |
| 9,534,473 B2 | 1/2017 | Morris et al. |
| 9,546,652 B2 | 1/2017 | Yin |
| 9,550,501 B2 | 1/2017 | Ledbetter |
| 9,556,721 B2 | 1/2017 | Jang et al. |
| 9,562,420 B2 | 2/2017 | Morris et al. |
| 9,570,945 B2 | 2/2017 | Fischer |
| 9,579,980 B2 | 2/2017 | Cryer et al. |
| 9,587,649 B2 | 3/2017 | Oehring |
| 9,611,728 B2 | 4/2017 | Oehring |
| 9,617,808 B2 | 4/2017 | Liu et al. |
| 9,638,101 B1 | 5/2017 | Crowe et al. |
| 9,638,194 B2 | 5/2017 | Wiegman et al. |
| 9,650,871 B2 | 5/2017 | Oehring et al. |
| 9,656,762 B2 | 5/2017 | Kamath et al. |
| 9,689,316 B1 | 6/2017 | Crom |
| 9,695,808 B2 | 7/2017 | Giessbach et al. |
| 9,739,130 B2 | 8/2017 | Young |
| 9,764,266 B1 | 9/2017 | Carter |
| 9,777,748 B2 | 10/2017 | Lu et al. |
| 9,803,467 B2 | 10/2017 | Tang et al. |
| 9,803,793 B2 | 10/2017 | Davi et al. |
| 9,809,308 B2 | 11/2017 | Aguilar et al. |
| 9,829,002 B2 | 11/2017 | Crom |
| 9,840,897 B2 | 12/2017 | Larson |
| 9,840,901 B2 | 12/2017 | Oering et al. |
| 9,845,730 B2 | 12/2017 | Betti et al. |
| 9,850,422 B2 | 12/2017 | Lestz et al. |
| 9,856,131 B1 | 1/2018 | Moffitt |
| 9,863,279 B2 | 1/2018 | Laing et al. |
| 9,869,305 B1 | 1/2018 | Crowe et al. |
| 9,879,609 B1 | 1/2018 | Crowe et al. |
| RE46,725 E | 2/2018 | Case et al. |
| 9,893,500 B2 | 2/2018 | Oehring et al. |
| 9,893,660 B2 | 2/2018 | Peterson et al. |
| 9,897,003 B2 | 2/2018 | Motakef et al. |
| 9,920,615 B2 | 3/2018 | Zhang et al. |
| 9,945,365 B2 | 4/2018 | Hernandez et al. |
| 9,964,052 B2 | 5/2018 | Millican et al. |
| 9,970,278 B2 | 5/2018 | Broussard et al. |
| 9,981,840 B2 | 5/2018 | Shock |
| 9,995,102 B2 | 6/2018 | Dillie et al. |
| 9,995,218 B2 | 6/2018 | Oehring et al. |
| 10,008,880 B2 | 6/2018 | Vicknair et al. |
| 10,008,912 B2 | 6/2018 | Davey et al. |
| 10,018,096 B2 | 7/2018 | Wallimann et al. |
| 10,020,711 B2 | 7/2018 | Oehring et al. |
| 10,024,123 B2 | 7/2018 | Steffenhagen et al. |
| 10,029,289 B2 | 7/2018 | Wendorski et al. |
| 10,030,579 B2 | 7/2018 | Austin et al. |
| 10,036,238 B2 | 7/2018 | Oehring |
| 10,040,541 B2 | 8/2018 | Wilson et al. |
| 10,060,293 B2 | 8/2018 | Del Bono |
| 10,060,349 B2 | 8/2018 | Álvarez et al. |
| 10,077,933 B2 | 9/2018 | Nelson et al. |
| 10,082,137 B2 | 9/2018 | Graham et al. |
| 10,094,366 B2 | 10/2018 | Marica |
| 10,100,827 B2 | 10/2018 | Devan et al. |
| 10,107,084 B2 | 10/2018 | Coli et al. |
| 10,107,085 B2 | 10/2018 | Coli et al. |
| 10,114,061 B2 | 10/2018 | Frampton et al. |
| 10,119,381 B2 | 11/2018 | Oehring et al. |
| 10,125,750 B2 | 11/2018 | Pfaff |
| 10,134,257 B2 | 11/2018 | Zhang et al. |
| 10,138,098 B2 | 11/2018 | Sorensen et al. |
| 10,151,244 B2 | 12/2018 | Giancotti et al. |
| 10,161,423 B2 | 12/2018 | Rampen |
| 10,174,599 B2 | 1/2019 | Shampine et al. |
| 10,184,397 B2 | 1/2019 | Austin et al. |

(56) References Cited

U.S. PATENT DOCUMENTS

| | | |
|---|---|---|
| 10,196,258 B2 | 2/2019 | Kalala et al. |
| 10,221,856 B2 | 3/2019 | Hernandez et al. |
| 10,227,854 B2 | 3/2019 | Glass |
| 10,227,855 B2 | 3/2019 | Coli et al. |
| 10,246,984 B2 | 4/2019 | Payne et al. |
| 10,247,182 B2 | 4/2019 | Zhang et al. |
| 10,254,732 B2 | 4/2019 | Oehring et al. |
| 10,267,439 B2 | 4/2019 | Pryce et al. |
| 10,280,724 B2 | 5/2019 | Hinderliter |
| 10,287,943 B1 | 5/2019 | Schiltz |
| 10,288,519 B2 | 5/2019 | De La Cruz |
| 10,303,190 B2 | 5/2019 | Shock |
| 10,305,350 B2 | 5/2019 | Johnson et al. |
| 10,316,832 B2 | 6/2019 | Byrne |
| 10,317,875 B2 | 6/2019 | Pandurangan |
| 10,337,402 B2 | 7/2019 | Austin et al. |
| 10,358,035 B2 | 7/2019 | Cryer |
| 10,371,012 B2 | 8/2019 | Davis et al. |
| 10,374,485 B2 | 8/2019 | Morris et al. |
| 10,378,326 B2 | 8/2019 | Morris et al. |
| 10,393,108 B2 | 8/2019 | Chong et al. |
| 10,407,990 B2 | 9/2019 | Oehring et al. |
| 10,408,031 B2 | 9/2019 | Oehring et al. |
| 10,415,348 B2 | 9/2019 | Zhang et al. |
| 10,415,557 B1 | 9/2019 | Crowe et al. |
| 10,415,562 B2 | 9/2019 | Kajita et al. |
| RE47,695 E | 11/2019 | Case et al. |
| 10,465,689 B2 | 11/2019 | Crom |
| 10,478,753 B1 | 11/2019 | Elms et al. |
| 10,526,882 B2 | 1/2020 | Oehring et al. |
| 10,563,649 B2 | 2/2020 | Zhang et al. |
| 10,577,910 B2 | 3/2020 | Stephenson |
| 10,584,645 B2 | 3/2020 | Nakagawa et al. |
| 10,590,867 B2 | 3/2020 | Thomassin et al. |
| 10,598,258 B2 | 3/2020 | Oehring et al. |
| 10,610,842 B2 | 4/2020 | Chong |
| 10,662,749 B1 | 5/2020 | Hill et al. |
| 10,711,787 B1 | 7/2020 | Darley |
| 10,738,580 B1 | 8/2020 | Fischer et al. |
| 10,753,153 B1 | 8/2020 | Fischer et al. |
| 10,753,165 B1 | 8/2020 | Fischer et al. |
| 10,760,556 B1 | 9/2020 | Crom et al. |
| 10,794,165 B2 | 10/2020 | Fischer et al. |
| 10,794,166 B2 | 10/2020 | Reckels et al. |
| 10,801,311 B1 | 10/2020 | Cui et al. |
| 10,815,764 B1 | 10/2020 | Yeung et al. |
| 10,815,978 B2 | 10/2020 | Glass |
| 10,830,032 B1 | 11/2020 | Zhang et al. |
| 10,830,225 B2 | 11/2020 | Repaci |
| 10,859,203 B1 | 12/2020 | Cui et al. |
| 10,864,487 B1 | 12/2020 | Han et al. |
| 10,865,624 B1 | 12/2020 | Cui et al. |
| 10,865,631 B1 | 12/2020 | Zhang et al. |
| 10,870,093 B1 | 12/2020 | Zhong et al. |
| 10,871,045 B2 | 12/2020 | Fischer et al. |
| 10,895,202 B1 | 1/2021 | Yeung et al. |
| 10,900,475 B2 | 1/2021 | Weightman et al. |
| 10,907,459 B1 | 2/2021 | Yeung et al. |
| 10,927,774 B2 | 2/2021 | Cai et al. |
| 10,954,770 B1 | 3/2021 | Yeung et al. |
| 10,954,855 B1 | 3/2021 | Ji et al. |
| 10,961,908 B1 | 3/2021 | Yeung et al. |
| 10,961,912 B1 | 3/2021 | Yeung et al. |
| 10,961,914 B1 | 3/2021 | Yeung et al. |
| 10,961,993 B1 | 3/2021 | Ji et al. |
| 10,961,995 B2 | 3/2021 | Mayorca |
| 10,982,523 B1 | 4/2021 | Hill et al. |
| 10,989,019 B2 | 4/2021 | Cai et al. |
| 10,995,564 B2 | 5/2021 | Miller et al. |
| 11,002,189 B2 | 5/2021 | Yeung et al. |
| 11,008,950 B2 | 5/2021 | Ethier et al. |
| 11,015,423 B1 | 5/2021 | Yeung et al. |
| 11,035,213 B2 | 6/2021 | Dusterhoft et al. |
| 11,035,214 B2 | 6/2021 | Cui et al. |
| 11,047,379 B1 | 6/2021 | Li et al. |
| 11,053,853 B2 | 7/2021 | Li et al. |
| 11,060,455 B1 | 7/2021 | Yeung et al. |
| 11,085,281 B1 | 8/2021 | Yeung et al. |
| 11,085,282 B2 | 8/2021 | Mazrooee et al. |
| 11,105,250 B1 | 8/2021 | Zhang et al. |
| 11,105,266 B2 | 8/2021 | Zhou et al. |
| 11,125,156 B2 | 9/2021 | Zhang et al. |
| 11,143,000 B2 | 10/2021 | Li et al. |
| 11,143,006 B1 | 10/2021 | Zhang et al. |
| 11,168,681 B2 | 11/2021 | Boguski |
| 11,236,739 B2 | 2/2022 | Yeung et al. |
| 11,242,737 B2 | 2/2022 | Zhang et al. |
| 11,243,509 B2 | 2/2022 | Cai et al. |
| 11,251,650 B1 | 2/2022 | Liu et al. |
| 11,261,717 B2 | 3/2022 | Yeung et al. |
| 11,268,346 B2 | 3/2022 | Yeung et al. |
| 11,280,266 B2 | 3/2022 | Yeung et al. |
| RE49,083 E | 5/2022 | Case et al. |
| 11,339,638 B1 | 5/2022 | Yeung et al. |
| 11,346,200 B2 | 5/2022 | Cai et al. |
| 11,373,058 B2 | 6/2022 | Jaaskelainen et al. |
| RE49,140 E | 7/2022 | Case et al. |
| 11,377,943 B2 | 7/2022 | Kriebel et al. |
| RE49,155 E | 8/2022 | Case et al. |
| RE49,156 E | 8/2022 | Case et al. |
| 11,401,927 B2 | 8/2022 | Li et al. |
| 11,441,483 B2 | 9/2022 | Li et al. |
| 11,448,122 B2 | 9/2022 | Feng et al. |
| 11,466,680 B2 | 10/2022 | Yeung et al. |
| 11,480,040 B2 | 10/2022 | Han et al. |
| 11,492,887 B2 | 11/2022 | Cui et al. |
| 11,499,405 B2 | 11/2022 | Zhang et al. |
| 11,506,039 B2 | 11/2022 | Zhang et al. |
| 2002/0126922 A1 | 9/2002 | Cheng et al. |
| 2002/0197176 A1 | 12/2002 | Kondo |
| 2003/0031568 A1 | 2/2003 | Stiefel |
| 2003/0061819 A1 | 4/2003 | Kuroki et al. |
| 2004/0016245 A1 | 1/2004 | Pierson |
| 2004/0074238 A1 | 4/2004 | Wantanabe et al. |
| 2004/0076526 A1 | 4/2004 | Fukano et al. |
| 2004/0187950 A1 | 9/2004 | Cohen et al. |
| 2004/0219040 A1 | 11/2004 | Kugelev et al. |
| 2005/0051322 A1 | 3/2005 | Speer |
| 2005/0056081 A1 | 3/2005 | Gocho |
| 2005/0139286 A1 | 6/2005 | Poulter |
| 2005/0196298 A1 | 9/2005 | Manning |
| 2005/0226754 A1 | 10/2005 | Orr et al. |
| 2005/0274134 A1 | 12/2005 | Ryu et al. |
| 2006/0061091 A1 | 3/2006 | Osterloh |
| 2006/0062914 A1 | 3/2006 | Garg et al. |
| 2006/0196251 A1 | 9/2006 | Richey |
| 2006/0211356 A1 | 9/2006 | Grassman |
| 2006/0260331 A1 | 11/2006 | Andreychuk |
| 2006/0272333 A1 | 12/2006 | Sundin |
| 2007/0029090 A1 | 2/2007 | Andreychuk et al. |
| 2007/0041848 A1 | 2/2007 | Wood et al. |
| 2007/0066406 A1 | 3/2007 | Keller et al. |
| 2007/0098580 A1 | 5/2007 | Petersen |
| 2007/0107981 A1 | 5/2007 | Sicotte |
| 2007/0125544 A1 | 6/2007 | Robinson et al. |
| 2007/0169543 A1 | 7/2007 | Fazekas |
| 2007/0181212 A1 | 8/2007 | Fell |
| 2007/0277982 A1 | 12/2007 | Shampine et al. |
| 2007/0295569 A1 | 12/2007 | Manzoor et al. |
| 2008/0006089 A1 | 1/2008 | Adnan et al. |
| 2008/0098891 A1 | 5/2008 | Feher |
| 2008/0161974 A1 | 7/2008 | Alston |
| 2008/0264625 A1 | 10/2008 | Ochoa |
| 2008/0264649 A1 | 10/2008 | Crawford |
| 2008/0298982 A1 | 12/2008 | Pabst |
| 2009/0064685 A1 | 3/2009 | Busekros et al. |
| 2009/0068031 A1 | 3/2009 | Gambier et al. |
| 2009/0092510 A1 | 4/2009 | Williams et al. |
| 2009/0124191 A1 | 5/2009 | Van Becelaere et al. |
| 2009/0178412 A1 | 7/2009 | Spytek |
| 2009/0249794 A1 | 10/2009 | Wilkes et al. |
| 2009/0252616 A1 | 10/2009 | Brunet et al. |
| 2009/0308602 A1 | 12/2009 | Bruins et al. |
| 2010/0019626 A1 | 1/2010 | Stout et al. |

(56) References Cited

U.S. PATENT DOCUMENTS

| | | |
|---|---|---|
| 2010/0071899 A1 | 3/2010 | Coquilleau et al. |
| 2010/0218508 A1 | 9/2010 | Brown et al. |
| 2010/0300683 A1 | 12/2010 | Looper et al. |
| 2010/0310384 A1 | 12/2010 | Stephenson et al. |
| 2011/0041681 A1 | 2/2011 | Duerr |
| 2011/0052423 A1 | 3/2011 | Gambier et al. |
| 2011/0054704 A1 | 3/2011 | Karpman et al. |
| 2011/0085924 A1 | 4/2011 | Shampine et al. |
| 2011/0146244 A1 | 6/2011 | Farman et al. |
| 2011/0146246 A1 | 6/2011 | Farman et al. |
| 2011/0173991 A1 | 7/2011 | Dean |
| 2011/0197988 A1 | 8/2011 | Van Vliet et al. |
| 2011/0241888 A1 | 10/2011 | Lu et al. |
| 2011/0265443 A1 | 11/2011 | Ansari |
| 2011/0272158 A1 | 11/2011 | Neal |
| 2012/0023973 A1 | 2/2012 | Mayorca |
| 2012/0048242 A1 | 3/2012 | Sumilla et al. |
| 2012/0085541 A1 | 4/2012 | Love et al. |
| 2012/0137699 A1 | 6/2012 | Montagne et al. |
| 2012/0179444 A1 | 7/2012 | Ganguly et al. |
| 2012/0192542 A1 | 8/2012 | Chillar et al. |
| 2012/0199001 A1 | 8/2012 | Chillar et al. |
| 2012/0204627 A1 | 8/2012 | Anderl et al. |
| 2012/0255734 A1 | 10/2012 | Coli et al. |
| 2012/0310509 A1 | 12/2012 | Pardo et al. |
| 2012/0324903 A1 | 12/2012 | Dewis et al. |
| 2013/0068307 A1 | 3/2013 | Hains et al. |
| 2013/0087045 A1 | 4/2013 | Sullivan et al. |
| 2013/0087945 A1 | 4/2013 | Kusters et al. |
| 2013/0134702 A1 | 5/2013 | Boraas et al. |
| 2013/0189915 A1 | 7/2013 | Hazard |
| 2013/0233165 A1 | 9/2013 | Matzner et al. |
| 2013/0255953 A1 | 10/2013 | Tudor |
| 2013/0259707 A1 | 10/2013 | Yin |
| 2013/0284455 A1 | 10/2013 | Kajaria et al. |
| 2013/0300341 A1 | 11/2013 | Gillette |
| 2013/0306322 A1 | 11/2013 | Sanborn |
| 2014/0010671 A1 | 1/2014 | Cryer et al. |
| 2014/0013768 A1 | 1/2014 | Laing et al. |
| 2014/0032082 A1 | 1/2014 | Gehrke et al. |
| 2014/0044517 A1 | 2/2014 | Saha et al. |
| 2014/0048253 A1 | 2/2014 | Andreychuk |
| 2014/0090729 A1 | 4/2014 | Coulter et al. |
| 2014/0090742 A1 | 4/2014 | Coskrey et al. |
| 2014/0094105 A1 | 4/2014 | Lundh et al. |
| 2014/0095114 A1 | 4/2014 | Thomeer et al. |
| 2014/0095554 A1 | 4/2014 | Thomeer et al. |
| 2014/0123621 A1 | 5/2014 | Driessens et al. |
| 2014/0130422 A1 | 5/2014 | Laing et al. |
| 2014/0138079 A1 | 5/2014 | Broussard et al. |
| 2014/0144641 A1 | 5/2014 | Chandler |
| 2014/0147291 A1 | 5/2014 | Burnette |
| 2014/0158345 A1 | 6/2014 | Jang et al. |
| 2014/0196459 A1 | 7/2014 | Futa et al. |
| 2014/0216736 A1 | 8/2014 | Leugemors et al. |
| 2014/0219824 A1 | 8/2014 | Burnette |
| 2014/0250845 A1 | 9/2014 | Jackson et al. |
| 2014/0251623 A1 | 9/2014 | Lestz et al. |
| 2014/0277772 A1 | 9/2014 | Lopez et al. |
| 2014/0290266 A1 | 10/2014 | Veilleux, Jr. et al. |
| 2014/0318638 A1 | 10/2014 | Harwood et al. |
| 2014/0322050 A1 | 10/2014 | Marette et al. |
| 2015/0027730 A1 | 1/2015 | Hall et al. |
| 2015/0078924 A1 | 3/2015 | Zhang et al. |
| 2015/0101344 A1 | 4/2015 | Jarrier et al. |
| 2015/0114652 A1 | 4/2015 | Lestz et al. |
| 2015/0129210 A1 | 5/2015 | Chong et al. |
| 2015/0135659 A1 | 5/2015 | Jarrier et al. |
| 2015/0159553 A1 | 6/2015 | Kippel et al. |
| 2015/0192117 A1 | 7/2015 | Bridges |
| 2015/0204148 A1 | 7/2015 | Liu et al. |
| 2015/0204322 A1 | 7/2015 | Iund et al. |
| 2015/0211512 A1 | 7/2015 | Wiegman et al. |
| 2015/0214816 A1 | 7/2015 | Raad |
| 2015/0217672 A1 | 8/2015 | Shampine et al. |
| 2015/0226140 A1 | 8/2015 | Zhang et al. |
| 2015/0252661 A1 | 9/2015 | Glass |
| 2015/0275891 A1 | 10/2015 | Chong et al. |
| 2015/0337730 A1 | 11/2015 | Kupiszewski et al. |
| 2015/0340864 A1 | 11/2015 | Compton |
| 2015/0345385 A1 | 12/2015 | Santini |
| 2015/0369351 A1 | 12/2015 | Hermann et al. |
| 2016/0032703 A1 | 2/2016 | Broussard et al. |
| 2016/0032836 A1 | 2/2016 | Hawkinson et al. |
| 2016/0102581 A1 | 4/2016 | Del Bono |
| 2016/0105022 A1 | 4/2016 | Oehring et al. |
| 2016/0108713 A1 | 4/2016 | Dunaeva et al. |
| 2016/0168979 A1 | 6/2016 | Zhang et al. |
| 2016/0177675 A1 | 6/2016 | Morris et al. |
| 2016/0177945 A1 | 6/2016 | Byrne et al. |
| 2016/0186671 A1 | 6/2016 | Austin et al. |
| 2016/0195082 A1 | 7/2016 | Wiegman et al. |
| 2016/0215774 A1 | 7/2016 | Oklejas et al. |
| 2016/0230525 A1 | 8/2016 | Lestz et al. |
| 2016/0244314 A1 | 8/2016 | Van Vliet et al. |
| 2016/0248230 A1 | 8/2016 | Tawy et al. |
| 2016/0253634 A1 | 9/2016 | Thomeer et al. |
| 2016/0258267 A1 | 9/2016 | Payne et al. |
| 2016/0273328 A1 | 9/2016 | Oehring |
| 2016/0273346 A1 | 9/2016 | Tang et al. |
| 2016/0290114 A1 | 10/2016 | Oehring et al. |
| 2016/0319650 A1 | 11/2016 | Oehring et al. |
| 2016/0326845 A1 | 11/2016 | Djikpesse et al. |
| 2016/0348479 A1 | 12/2016 | Oehring et al. |
| 2016/0369609 A1 | 12/2016 | Morris et al. |
| 2017/0009905 A1 | 1/2017 | Arnold |
| 2017/0016433 A1 | 1/2017 | Chong et al. |
| 2017/0030177 A1 | 2/2017 | Oehring et al. |
| 2017/0038137 A1 | 2/2017 | Turney |
| 2017/0045055 A1 | 2/2017 | Hoefel et al. |
| 2017/0052087 A1 | 2/2017 | Faqihi et al. |
| 2017/0074074 A1 | 3/2017 | Joseph et al. |
| 2017/0074076 A1 | 3/2017 | Joseph et al. |
| 2017/0074089 A1 | 3/2017 | Agarwal et al. |
| 2017/0082110 A1 | 3/2017 | Lammers |
| 2017/0089189 A1 | 3/2017 | Norris et al. |
| 2017/0114613 A1 | 4/2017 | Lecerf et al. |
| 2017/0114625 A1 | 4/2017 | Norris et al. |
| 2017/0122310 A1 | 5/2017 | Ladron de Guevara |
| 2017/0131174 A1 | 5/2017 | Enev et al. |
| 2017/0145918 A1 | 5/2017 | Oehring et al. |
| 2017/0191350 A1 | 7/2017 | Johns et al. |
| 2017/0218727 A1 | 8/2017 | Oehring et al. |
| 2017/0226839 A1 | 8/2017 | Broussard et al. |
| 2017/0226998 A1 | 8/2017 | Zhang et al. |
| 2017/0227002 A1 | 8/2017 | Mikulski et al. |
| 2017/0233103 A1 | 8/2017 | Teicholz et al. |
| 2017/0234165 A1 | 8/2017 | Kersey et al. |
| 2017/0234308 A1 | 8/2017 | Buckley |
| 2017/0241336 A1 | 8/2017 | Jones et al. |
| 2017/0248034 A1 | 8/2017 | Dzieciol et al. |
| 2017/0248208 A1 | 8/2017 | Tamura |
| 2017/0248308 A1 | 8/2017 | Makarychev-Mikhailov et al. |
| 2017/0275149 A1 | 9/2017 | Schmidt |
| 2017/0288400 A1 | 10/2017 | Williams |
| 2017/0292409 A1 | 10/2017 | Aguilar et al. |
| 2017/0302135 A1 | 10/2017 | Cory |
| 2017/0305736 A1 | 10/2017 | Haile et al. |
| 2017/0306847 A1 | 10/2017 | Suciu et al. |
| 2017/0306936 A1 | 10/2017 | Dole |
| 2017/0322086 A1 | 11/2017 | Luharuka |
| 2017/0333086 A1 | 11/2017 | Jackson |
| 2017/0334448 A1 | 11/2017 | Schwunk |
| 2017/0335842 A1 | 11/2017 | Robinson et al. |
| 2017/0350471 A1 | 12/2017 | Steidl et al. |
| 2017/0370199 A1 | 12/2017 | Witkowski et al. |
| 2017/0370480 A1 | 12/2017 | Witkowski et al. |
| 2018/0034280 A1 | 2/2018 | Pedersen |
| 2018/0038328 A1 | 2/2018 | Louven et al. |
| 2018/0041093 A1 | 2/2018 | Miranda |
| 2018/0045202 A1 | 2/2018 | Crom |
| 2018/0038216 A1 | 3/2018 | Zhang et al. |
| 2018/0058171 A1 | 3/2018 | Roesner et al. |
| 2018/0087499 A1 | 3/2018 | Zhang et al. |

(56) References Cited

U.S. PATENT DOCUMENTS

| | | |
|---|---|---|
| 2018/0087996 A1 | 3/2018 | De La Cruz |
| 2018/0156210 A1 | 6/2018 | Oehring et al. |
| 2018/0172294 A1 | 6/2018 | Owen |
| 2018/0183219 A1 | 6/2018 | Oehring et al. |
| 2018/0186442 A1 | 7/2018 | Maier |
| 2018/0187662 A1 | 7/2018 | Hill et al. |
| 2018/0209415 A1 | 7/2018 | Zhang et al. |
| 2018/0223640 A1 | 8/2018 | Keihany et al. |
| 2018/0224044 A1 | 8/2018 | Penney |
| 2018/0229998 A1 | 8/2018 | Shock |
| 2018/0258746 A1 | 9/2018 | Broussard et al. |
| 2018/0266412 A1 | 9/2018 | Stokkevag et al. |
| 2018/0278124 A1 | 9/2018 | Oehring et al. |
| 2018/0283102 A1 | 10/2018 | Cook |
| 2018/0283618 A1 | 10/2018 | Cook |
| 2018/0284817 A1 | 10/2018 | Cook et al. |
| 2018/0290877 A1 | 10/2018 | Shock |
| 2018/0291781 A1 | 10/2018 | Pedrini |
| 2018/0298731 A1 | 10/2018 | Bishop |
| 2018/0298735 A1 | 10/2018 | Conrad |
| 2018/0307255 A1 | 10/2018 | Bishop |
| 2018/0313456 A1 | 11/2018 | Bayyouk et al. |
| 2018/0328157 A1 | 11/2018 | Bishop |
| 2018/0334893 A1 | 11/2018 | Oehring |
| 2018/0363435 A1 | 12/2018 | Coli et al. |
| 2018/0363436 A1 | 12/2018 | Coli et al. |
| 2018/0363437 A1 | 12/2018 | Coli et al. |
| 2018/0363438 A1 | 12/2018 | Coli et al. |
| 2019/0003272 A1 | 1/2019 | Morris et al. |
| 2019/0003329 A1 | 1/2019 | Morris et al. |
| 2019/0010793 A1 | 1/2019 | Hinderliter |
| 2019/0011051 A1 | 1/2019 | Yeung |
| 2019/0048993 A1 | 2/2019 | Akiyama et al. |
| 2019/0063263 A1 | 2/2019 | Davis et al. |
| 2019/0063341 A1 | 2/2019 | Davis |
| 2019/0067991 A1 | 2/2019 | Davis et al. |
| 2019/0071992 A1 | 3/2019 | Feng |
| 2019/0072005 A1 | 3/2019 | Fisher et al. |
| 2019/0078471 A1 | 3/2019 | Braglia et al. |
| 2019/0091619 A1 | 3/2019 | Huang |
| 2019/0106316 A1 | 4/2019 | Van Vliet et al. |
| 2019/0106970 A1 | 4/2019 | Oehring |
| 2019/0112908 A1 | 4/2019 | Coli et al. |
| 2019/0112910 A1 | 4/2019 | Oehring et al. |
| 2019/0119096 A1 | 4/2019 | Haile et al. |
| 2019/0120024 A1 | 4/2019 | Oehring et al. |
| 2019/0120031 A1 | 4/2019 | Gilje |
| 2019/0120134 A1 | 4/2019 | Goleczka et al. |
| 2019/0128247 A1 | 5/2019 | Douglas, III |
| 2019/0128288 A1 | 5/2019 | Konada et al. |
| 2019/0131607 A1 | 5/2019 | Gillette |
| 2019/0136677 A1 | 5/2019 | Shampine et al. |
| 2019/0153843 A1 | 5/2019 | Headrick et al. |
| 2019/0153938 A1 | 5/2019 | Hammoud |
| 2019/0154020 A1 | 5/2019 | Glass |
| 2019/0155318 A1 | 5/2019 | Meunier |
| 2019/0264667 A1 | 5/2019 | Byrne |
| 2019/0178234 A1 | 6/2019 | Beisel |
| 2019/0178235 A1 | 6/2019 | Coskrey et al. |
| 2019/0185312 A1 | 6/2019 | Bush et al. |
| 2019/0203572 A1 | 7/2019 | Morris et al. |
| 2019/0204021 A1 | 7/2019 | Morris et al. |
| 2019/0211661 A1 | 7/2019 | Reckels et al. |
| 2019/0211814 A1 | 7/2019 | Weightman et al. |
| 2019/0217258 A1 | 7/2019 | Bishop |
| 2019/0226317 A1 | 7/2019 | Payne et al. |
| 2019/0245348 A1 | 8/2019 | Hinderliter et al. |
| 2019/0249652 A1 | 8/2019 | Stephenson et al. |
| 2019/0249754 A1 | 8/2019 | Oehring et al. |
| 2019/0257297 A1 | 8/2019 | Botting et al. |
| 2019/0277279 A1 | 9/2019 | Byrne et al. |
| 2019/0277295 A1 | 9/2019 | Clyburn et al. |
| 2019/0309585 A1 | 10/2019 | Miller et al. |
| 2019/0316447 A1 | 10/2019 | Oehring et al. |
| 2019/0316456 A1 | 10/2019 | Beisel et al. |
| 2019/0323337 A1 | 10/2019 | Glass et al. |
| 2019/0330923 A1 | 10/2019 | Gable et al. |
| 2019/0331117 A1 | 10/2019 | Gable et al. |
| 2019/0337392 A1 | 11/2019 | Joshi et al. |
| 2019/0338762 A1 | 11/2019 | Curry et al. |
| 2019/0345920 A1 | 11/2019 | Surjaatmadja et al. |
| 2019/0353103 A1 | 11/2019 | Roberge |
| 2019/0356199 A1 | 11/2019 | Morris et al. |
| 2019/0376449 A1 | 12/2019 | Carrell |
| 2019/0383123 A1 | 12/2019 | Hinderliter |
| 2020/0003205 A1 | 1/2020 | Stokkevåg et al. |
| 2020/0011165 A1 | 1/2020 | George et al. |
| 2020/0040878 A1 | 2/2020 | Morris |
| 2020/0049136 A1 | 2/2020 | Stephenson |
| 2020/0049153 A1 | 2/2020 | Headrick et al. |
| 2020/0071998 A1 | 3/2020 | Oehring et al. |
| 2020/0072201 A1 | 3/2020 | Marica |
| 2020/0088202 A1 | 3/2020 | Sigmar et al. |
| 2020/0095854 A1 | 3/2020 | Hinderliter |
| 2020/0109610 A1 | 4/2020 | Husoy et al. |
| 2020/0132058 A1 | 4/2020 | Mollatt |
| 2020/0141219 A1 | 5/2020 | Oehring et al. |
| 2020/0141326 A1 | 5/2020 | Redford et al. |
| 2020/0141907 A1 | 5/2020 | Meck et al. |
| 2020/0166026 A1 | 5/2020 | Marica |
| 2020/0206704 A1 | 7/2020 | Chong |
| 2020/0208733 A1 | 7/2020 | Kim |
| 2020/0223648 A1 | 7/2020 | Herman et al. |
| 2020/0224645 A1 | 7/2020 | Buckley |
| 2020/0232454 A1 | 7/2020 | Chretien et al. |
| 2020/0256333 A1 | 8/2020 | Surjaatmadja |
| 2020/0263498 A1 | 8/2020 | Fischer et al. |
| 2020/0263525 A1 | 8/2020 | Reid |
| 2020/0263526 A1 | 8/2020 | Fischer et al. |
| 2020/0263527 A1 | 8/2020 | Fischer et al. |
| 2020/0263528 A1 | 8/2020 | Fischer et al. |
| 2020/0267888 A1 | 8/2020 | Putz |
| 2020/0291731 A1 | 9/2020 | Haiderer et al. |
| 2020/0295574 A1 | 9/2020 | Batsch-Smith |
| 2020/0300050 A1 | 9/2020 | Oehring et al. |
| 2020/0309113 A1 | 10/2020 | Hunter et al. |
| 2020/0325752 A1 | 10/2020 | Clark et al. |
| 2020/0325760 A1 | 10/2020 | Markham |
| 2020/0325761 A1 | 10/2020 | Williams |
| 2020/0325893 A1 | 10/2020 | Kraige et al. |
| 2020/0332784 A1 | 10/2020 | Zhang et al. |
| 2020/0332788 A1 | 10/2020 | Cui et al. |
| 2020/0340313 A1 | 10/2020 | Fischer et al. |
| 2020/0340340 A1 | 10/2020 | Oehring et al. |
| 2020/0340344 A1 | 10/2020 | Reckels et al. |
| 2020/0340404 A1 | 10/2020 | Stockstill |
| 2020/0347725 A1 | 11/2020 | Morris et al. |
| 2020/0354928 A1 | 11/2020 | Wehler et al. |
| 2020/0362760 A1 | 11/2020 | Morenko et al. |
| 2020/0362764 A1 | 11/2020 | Saintignan et al. |
| 2020/0370394 A1 | 11/2020 | Cai et al. |
| 2020/0370408 A1 | 11/2020 | Cai et al. |
| 2020/0370429 A1 | 11/2020 | Cai et al. |
| 2020/0371490 A1 | 11/2020 | Cai et al. |
| 2020/0340322 A1 | 12/2020 | Sizemore et al. |
| 2020/0386222 A1 | 12/2020 | Pham et al. |
| 2020/0388140 A1 | 12/2020 | Gomez et al. |
| 2020/0392826 A1 | 12/2020 | Cui et al. |
| 2020/0392827 A1 | 12/2020 | George et al. |
| 2020/0393088 A1 | 12/2020 | Sizemore et al. |
| 2020/0398238 A1 | 12/2020 | Zhong et al. |
| 2020/0400000 A1 | 12/2020 | Ghasripoor et al. |
| 2020/0400005 A1 | 12/2020 | Han et al. |
| 2020/0407625 A1 | 12/2020 | Stephenson |
| 2020/0408071 A1 | 12/2020 | Li et al. |
| 2020/0408144 A1 | 12/2020 | Feng et al. |
| 2020/0408147 A1 | 12/2020 | Zhang et al. |
| 2020/0408149 A1 | 12/2020 | Li et al. |
| 2021/0025324 A1 | 1/2021 | Morris et al. |
| 2021/0025383 A1 | 1/2021 | Bodishbaugh et al. |
| 2021/0032961 A1 | 2/2021 | Hinderliter et al. |
| 2021/0054727 A1 | 2/2021 | Floyd |
| 2021/0071503 A1 | 3/2021 | Ogg et al. |
| 2021/0071574 A1 | 3/2021 | Feng et al. |

(56) References Cited

U.S. PATENT DOCUMENTS

| | | |
|---|---|---|
| 2021/0071579 A1 | 3/2021 | Li et al. |
| 2021/0071654 A1 | 3/2021 | Brunson |
| 2021/0071752 A1 | 3/2021 | Cui et al. |
| 2021/0079758 A1 | 3/2021 | Yeung et al. |
| 2021/0079851 A1 | 3/2021 | Yeung et al. |
| 2021/0086851 A1 | 3/2021 | Zhang et al. |
| 2021/0087883 A1 | 3/2021 | Zhang et al. |
| 2021/0087916 A1 | 3/2021 | Zhang et al. |
| 2021/0087925 A1 | 3/2021 | Heidari et al. |
| 2021/0087943 A1 | 3/2021 | Cui et al. |
| 2021/0088042 A1 | 3/2021 | Zhang et al. |
| 2021/0123425 A1 | 4/2021 | Cui et al. |
| 2021/0123434 A1 | 4/2021 | Cui et al. |
| 2021/0123435 A1 | 4/2021 | Cui et al. |
| 2021/0131409 A1 | 5/2021 | Cui et al. |
| 2021/0140416 A1 | 5/2021 | Buckley |
| 2021/0148208 A1 | 5/2021 | Thomas et al. |
| 2021/0156240 A1 | 5/2021 | Cicci et al. |
| 2021/0156241 A1 | 5/2021 | Cook |
| 2021/0172282 A1 | 6/2021 | Wang et al. |
| 2021/0180517 A1 | 6/2021 | Zhou et al. |
| 2021/0199110 A1 | 7/2021 | Albert et al. |
| 2021/0222690 A1 | 7/2021 | Beisel |
| 2021/0239112 A1 | 8/2021 | Buckley |
| 2021/0246774 A1 | 8/2021 | Cui et al. |
| 2021/0270264 A1 | 9/2021 | Byrne |
| 2021/0285311 A1 | 9/2021 | Ji et al. |
| 2021/0285432 A1 | 9/2021 | Ji et al. |
| 2021/0301807 A1 | 9/2021 | Cui et al. |
| 2021/0306720 A1 | 9/2021 | Sandoval et al. |
| 2021/0308638 A1 | 10/2021 | Zhong et al. |
| 2021/0348475 A1 | 11/2021 | Yeung et al. |
| 2021/0348476 A1 | 11/2021 | Yeung et al. |
| 2021/0348477 A1 | 11/2021 | Yeung et al. |
| 2021/0355927 A1 | 11/2021 | Jian et al. |
| 2021/0372395 A1 | 12/2021 | Li et al. |
| 2021/0388760 A1 | 12/2021 | Feng et al. |
| 2022/0082007 A1 | 3/2022 | Zhang et al. |
| 2022/0090476 A1 | 3/2022 | Zhang et al. |
| 2022/0090477 A1 | 3/2022 | Zhang et al. |
| 2022/0090478 A1 | 3/2022 | Zhang et al. |
| 2022/0112892 A1 | 4/2022 | Cui et al. |
| 2022/0120262 A1 | 4/2022 | Ji et al. |
| 2022/0145740 A1 | 5/2022 | Yuan et al. |
| 2022/0154775 A1 | 5/2022 | Liu et al. |
| 2022/0155373 A1 | 5/2022 | Liu et al. |
| 2022/0162931 A1 | 5/2022 | Zhong et al. |
| 2022/0162991 A1 | 5/2022 | Zhang et al. |
| 2022/0181859 A1 | 6/2022 | Ji et al. |
| 2022/0186724 A1 | 6/2022 | Chang et al. |
| 2022/0213777 A1 | 7/2022 | Cui et al. |
| 2022/0220836 A1 | 7/2022 | Zhang et al. |
| 2022/0224087 A1 | 7/2022 | Ji et al. |
| 2022/0228468 A1 | 7/2022 | Cui et al. |
| 2022/0228469 A1 | 7/2022 | Zhang et al. |
| 2022/0235639 A1 | 7/2022 | Zhang et al. |
| 2022/0235640 A1 | 7/2022 | Mao et al. |
| 2022/0235641 A1 | 7/2022 | Zhang et al. |
| 2022/0235642 A1 | 7/2022 | Zhang et al. |
| 2022/0235802 A1 | 7/2022 | Jiang et al. |
| 2022/0242297 A1 | 8/2022 | Tian et al. |
| 2022/0243613 A1 | 8/2022 | Ji et al. |
| 2022/0243724 A1 | 8/2022 | Li et al. |
| 2022/0250000 A1 | 8/2022 | Zhang et al. |
| 2022/0255319 A1 | 8/2022 | Liu et al. |
| 2022/0258659 A1 | 8/2022 | Cui et al. |
| 2022/0259947 A1 | 8/2022 | Li et al. |
| 2022/0259964 A1 | 8/2022 | Zhang et al. |
| 2022/0268201 A1 | 8/2022 | Feng et al. |
| 2022/0282606 A1 | 9/2022 | Zhong et al. |
| 2022/0282726 A1 | 9/2022 | Zhang et al. |
| 2022/0290549 A1 | 9/2022 | Zhang et al. |
| 2022/0294194 A1 | 9/2022 | Cao et al. |
| 2022/0298906 A1 | 9/2022 | Zhong et al. |
| 2022/0307359 A1 | 9/2022 | Liu et al. |
| 2022/0307424 A1 | 9/2022 | Wang et al. |
| 2022/0314248 A1 | 10/2022 | Ge et al. |
| 2022/0315347 A1 | 10/2022 | Liu et al. |
| 2022/0316306 A1 | 10/2022 | Liu et al. |
| 2022/0316362 A1 | 10/2022 | Zhang et al. |
| 2022/0316461 A1 | 10/2022 | Wang et al. |
| 2022/0325608 A1 | 10/2022 | Zhang et al. |
| 2022/0330411 A1 | 10/2022 | Liu et al. |
| 2022/0333471 A1 | 10/2022 | Zhong et al. |
| 2022/0339646 A1 | 10/2022 | Yu et al. |
| 2022/0341358 A1 | 10/2022 | Ji et al. |
| 2022/0341362 A1 | 10/2022 | Feng et al. |
| 2022/0341415 A1 | 10/2022 | Deng et al. |
| 2022/0345007 A1 | 10/2022 | Liu et al. |
| 2022/0349345 A1 | 11/2022 | Zhang et al. |
| 2022/0353980 A1 | 11/2022 | Liu et al. |
| 2022/0361309 A1 | 11/2022 | Liu et al. |
| 2022/0364452 A1 | 11/2022 | Wang et al. |
| 2022/0364453 A1 | 11/2022 | Chang et al. |
| 2022/0372865 A1 | 11/2022 | Lin et al. |
| 2022/0376280 A1 | 11/2022 | Shao et al. |
| 2022/0381126 | 12/2022 | Cui et al. |

FOREIGN PATENT DOCUMENTS

| | | |
|---|---|---|
| CA | 3138533 | 11/2020 |
| CN | 202935216 U | 5/2013 |
| DE | 102009022859 | 12/2010 |
| WO | 2016/014476 | 1/2016 |
| WO | 2017146279 | 8/2017 |
| WO | 2018/132106 | 7/2018 |
| WO | 2019117862 | 6/2019 |
| WO | 2021/038604 | 3/2021 |
| WO | 2021038604 | 3/2021 |

OTHER PUBLICATIONS

ISM, What is Cracking Pressure, 2019.
Swagelok, The right valve for controlling flow direction? Check, 2016.
Technology.org, Check valves how do they work and what are the main type, 2018.
De Gevigney et al., "Analysis of no-load dependent power losses in a planetary gear train by using thermal network method", International Gear Conference 2014: Aug. 26-28, 2014, Lyon, pp. 615-624.
"Honghua developing new-generation shale-drilling rig, plans testing of frac pump"; Katherine Scott; Drilling Contractor; May 23, 2013; accessed at https://www.drillingcontractor.org/honghua-developing-new-generation-shale-drilling-rig-plans-testing-of-frac-pump-23278.
Dziubak, Tadeusz, "Experimental Studies of Dust Suction Irregularity from Multi-Cyclone Dust Collector of Two-Stage Air Filter", Energies 2021, 14, 3577, 28 pages.
International Search Report and Written Opinion for PCT/US2022/030647, dated Oct. 7, 2022.
Rigmaster Machinery Ltd., Model: 2000 RMP-6-PLEX, brochure, downloaded at https://www.rigmastermachinery.com/_files/ugd/431e62_eaecd77c9fe54af8b13d08396072da67.pdf.

* cited by examiner

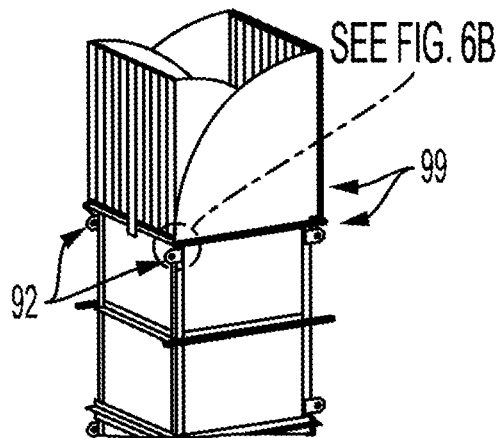
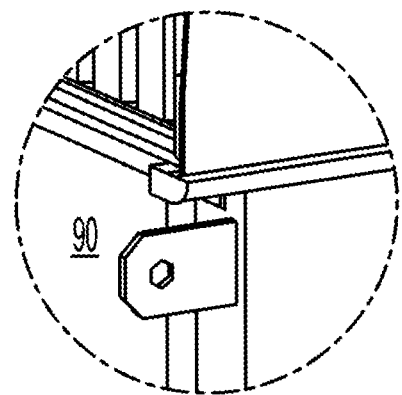
FIG. 6A    FIG. 6B
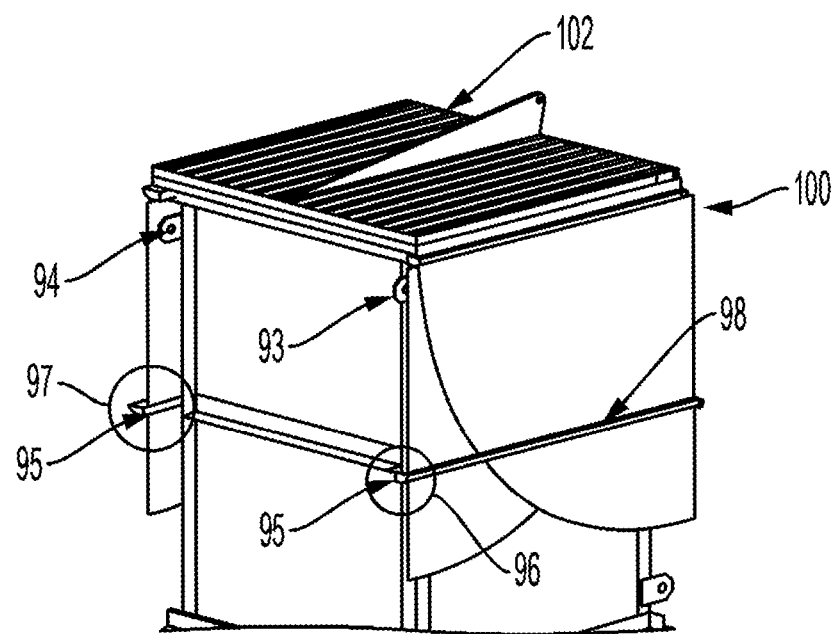
FIG. 7

METHODS FOR NOISE DAMPENING AND ATTENUATION OF TURBINE ENGINE

PRIORITY CLAIMS

This application is a continuation of U.S. Non-Provisional application Ser. No. 17/498,916, filed Oct. 12, 2021, titled "TURBINE ENGINE EXHAUST DUCT SYSTEM AND METHODS FOR NOISE DAMPENING AND ATTENUATION," which is a continuation of U.S. Non-Provisional application Ser. No. 17/182,325, filed Feb. 23, 2021, titled "TURBINE ENGINE EXHAUST DUCT SYSTEM AND METHODS FOR NOISE DAMPENING AND ATTENUATION," which is a continuation of U.S. Non-Provisional application Ser. No. 16/948,290, filed Sep. 11, 2020, titled "TURBINE ENGINE EXHAUST DUCT SYSTEM AND METHODS FOR NOISE DAMPENING AND ATTENUATION," now U.S. Pat. No. 10,961,914, issued Mar. 30, 2021, which claims priority to and the benefit of, U.S. Provisional Application No. 62/704,567, filed May 15, 2020, titled "TURBINE ENGINE EXHAUST DUCT SYSTEM FOR NOISE DAMPENING AND ATTENUATION," and U.S. Provisional Application No. 62/899,957, filed Sep. 13, 2019, titled "TURBINE ENGINE EXHAUST DUCT SYSTEM FOR NOISE DAMPENING AND ATTENUATION," the disclosures of which are incorporated herein by reference in their entireties.

TECHNICAL FIELD

In one aspect, the present disclosure relates to noise attenuation and dampening systems and methods for hydraulic fracturing and, in particular, to systems and methods for dampening and directional control of exhaust air flow from a gas turbine of a direct drive turbine fracturing system.

BACKGROUND

The present disclosure relates generally to a mobile fracking system and, more particularly, to a gas turbine-based mobile fracking system that may provide mechanical power through gearboxes connected to respective gas turbines and respective mechanically driven fluid pumps in a fracturing operation (also referable to as "fracking"). Such a mobile fracking system may include a plurality of such directly driven turbine (DDT) fracturing units for use in well stimulation and hydraulic fracturing operations. In addition to offering potential efficiency advantages compared to diesel fleets or electric fleets, DDT fracturing units may offer flexibility in operating on a wide variety of fuel compositions, while also providing improved reliability, lower emissions and/or smaller foot prints.

In a fracturing operation, a fluid mixture is injected under pressure at a wellbore into a rock formation that bears hydrocarbon to create fractures within a rock. In operation, the pressurized fluid mixture is pressure pumped down to fracture the subsurface geological formation and allows the flow of the hydrocarbon reserves, such as oil and/or gas. The fluid mixture may include water, various chemical additives, and proppants (e.g., sand, ceramic materials, and the like as will be understood by those skilled in the art). For example, and without limitation, the fracturing fluid may comprise a liquid petroleum gas, linear gelled water, gelled water, gelled oil, slick water, slick oil, poly emulsion, foam/ emulsion, liquid carbon dioxide ($CO_2$), nitrogen gas ($N_2$), and/or binary fluid and acid.

Mechanical power may be generated by the DDT fracturing units and used to deliver fracturing fluid through mechanically connected fluid pumps to a wellbore at the fracturing operation site. Surface pumping systems including fluid pumps are utilized to accommodate the various fluids and are typically mobilized at well sites on, for example, skids or tractor-trailers. In one conventional example, dedicated sources of power may include gas turbines connected to a source of natural gas that drives the respective gas turbine to produce mechanical power that may be sent to one or more of the surface pumping systems through mechanically connected gearboxes and/or transmission systems to operate the fluid pumps at desired speeds.

The fracturing operation site often encompasses a large footprint with the number of wells or wellheads and supporting components. The supporting components take time to be transported and to be setup for utilization at the fracturing operation sites. Due to the large nature of many fracturing operations, there exists a continued challenge to reduce the environmental impact resulting from fracturing operations. Accordingly, there exists a need for methods and systems for reducing the environmental impact of noise pollution produced by the fracturing operations.

SUMMARY

As referenced above, a fracturing operation may include a large number of gas turbines operating substantially concurrently. As a result, an undesirably large amount of noise may be generated by the fracturing operation.

The present disclosure is generally directed to systems and methods for dampening and directional control of exhaust air flow from a gas turbine of, for example, a direct drive turbine fracturing system. According to some embodiments, a method to attenuate noise associated with operation of a gas turbine engine during a fracturing operation may include connecting an inlet of a first elongated plenum to an exhaust duct of the gas turbine engine to receive exhaust gas via the exhaust duct. The method further may include connecting a noise attenuator to a distal end of the first elongated plenum. The noise attenuator may include a first silencer hood and a second silencer hood. The method also may include pivoting the first silencer hood from a stowed position at least partially overlapping the second silencer hood in a stowed position to an operative position. The method further may include pivoting the second silencer hood from the stowed position to an operative position so that the second silencer hood in combination with the first silencer hood define a second elongated plenum positioned to receive exhaust gas via the first elongated plenum. The first elongated plenum and the second elongated plenum may increase an effective length of the exhaust duct and may reduce sound emission associated with operation of the gas turbine engine.

According to some embodiments, a method to operate a mobile fracturing unit including a trailer, a gas turbine engine connected to the trailer, and a fluid pump connected to the gas turbine engine via a gearbox and to the trailer, may include providing a first elongated plenum having an inlet connected to an exhaust duct of the gas turbine engine to receive exhaust gas via the exhaust duct during operation of the gas turbine engine. The method further may include providing a noise attenuator connected to a distal end of the first elongated plenum. The noise attenuator may include a first silencer hood and a second silencer hood. The method also may include positioning the first silencer hood from a stowed position to an operative position, and positioning the second silencer hood from a stowed position to an operative position so that the second silencer hood in combination with the first silencer hood define a second elongated plenum positioned to receive exhaust gas via the first elongated plenum. The method further may include operating the gas turbine engine, such that exhaust gas from operation of the gas turbine engine flows from the exhaust duct through the first elongated plenum and the second elongated plenum to reduce sound emission associated with operation of the gas turbine engine.

According to some embodiments, a method to transport from a first fracturing operation site to a second fracturing operation site a mobile fracturing unit including a trailer, a gas turbine engine connected to the trailer, and a fluid pump connected to the gas turbine engine via a gearbox and to the trailer, may include providing a first elongated plenum having an inlet connected to an exhaust duct of the gas turbine engine to receive exhaust gas via the exhaust duct during operation of the gas turbine engine. The method further may include providing a noise attenuator connected to a distal end of the first elongated plenum. The noise attenuator may include a first silencer hood and a second silencer hood, the first silencer hood in an operative position in combination with the second silencer hood in an operative position defining a second elongated plenum positioned to receive exhaust gas via the first elongated plenum. The method also may include positioning the first silencer hood from the operative position to a stowed position for transport and positioning the second silencer hood from the operative position to a stowed position for transport. The method further may include moving the mobile fracturing unit from the first fracturing operation site to the second fracturing operation site.

Still other aspects, embodiments, and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. Accordingly, these and other objects, along with advantages and features of the present disclosure herein disclosed, will become apparent through reference to the following description and the accompanying drawings. Furthermore, it is to be understood that the features of the various embodiments described herein are not mutually exclusive and may exist in various combinations and permutations.

BRIEF DESCRIPTION OF THE DRAWINGS

The accompanying drawings, which are included to provide a further understanding of the embodiments of the present disclosure, are incorporated in and constitute a part of this specification, illustrate embodiments of the present disclosure, and together with the detailed description, serve to explain the principles of the embodiments discussed herein. No attempt is made to show structural details of this disclosure in more detail than may be necessary for a fundamental understanding of the exemplary embodiments discussed herein and the various ways in which they may be practiced. According to common practice, the various features of the drawings discussed below are not necessarily drawn to scale. Dimensions of various features and elements in the drawings may be expanded or reduced to more clearly illustrate the embodiments of the disclosure.

FIGS. 6A and 6B respectively show a perspective view and an enlarged perspective view of an example retention brace system having a first pair of opposing retention braces comprising a first brace mounted to exterior portions of the distal end of the lower elongated plenum and a second brace mounted to an opposed exterior portions of the distal end of the lower elongated plenum, each brace defining a slot that is sized and shaped for receipt of portions of respective side surfaces of the pair of silencer hoods according to an embodiment of the disclosure.

FIG. 7 shows an example retention brace system according to an embodiment of the disclosure having a first pair of opposing retention braces comprising a first brace mounted to exterior portions of the distal end of the lower elongated plenum and a second brace mounted to an opposed exterior portions of the distal end of the lower elongated plenum, each brace defining a slot that is sized and shaped for receipt of portions of respective side surfaces of the pair of silencer hoods and a second pair of opposing retention braces comprising a third brace spaced proximally from the first brace and mounted to exterior portions the lower elongated plenum and a fourth brace spaced proximally from the first brace and mounted to an opposed exterior portions of the lower elongated plenum, each brace defining a slot that is sized and shaped for receipt of respective side surfaces of the pair of silencer hoods when the pair of silencer hoods is positioned in the stowed position.

DETAILED DESCRIPTION

Figure 1:
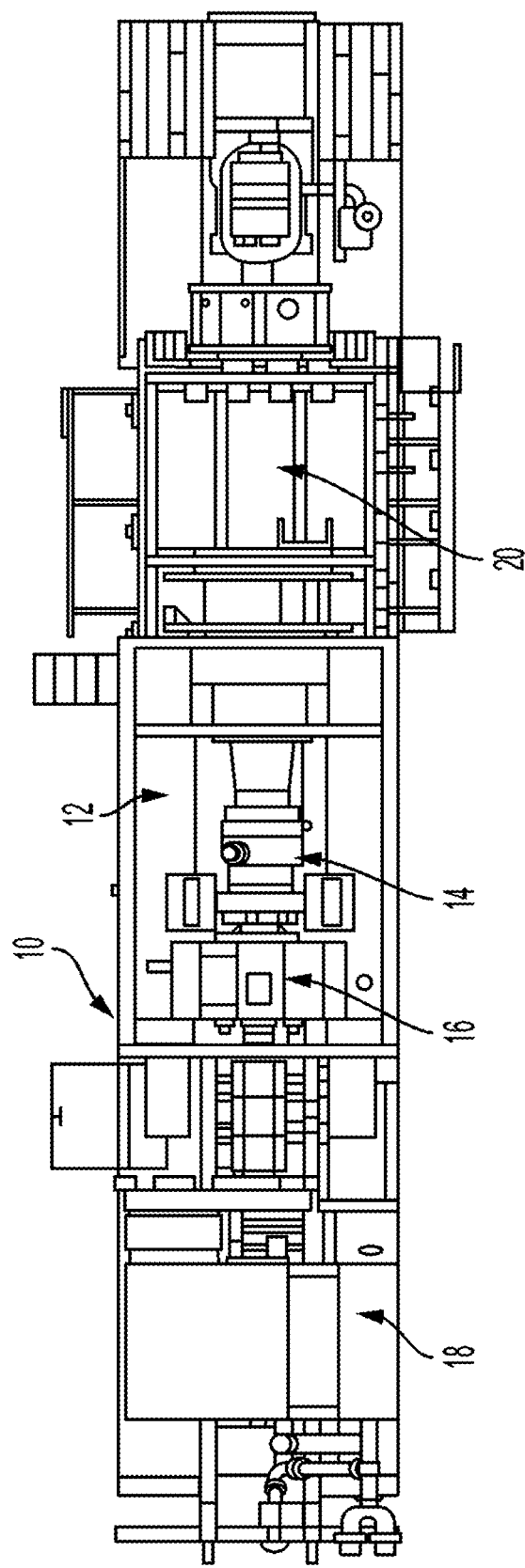
FIG. 1 is a schematic top view of an example of a mobile fracking system showing an example directly driven turbine fracturing unit having a gas turbine housed inside a trailer in an interior space within the trailer and showing a gearbox connected to the gas turbine for mechanically translating mechanical energy produced by the gas turbine to at least one fluid pump via a gearbox according to an embodiment of the disclosure.
Figure 2:
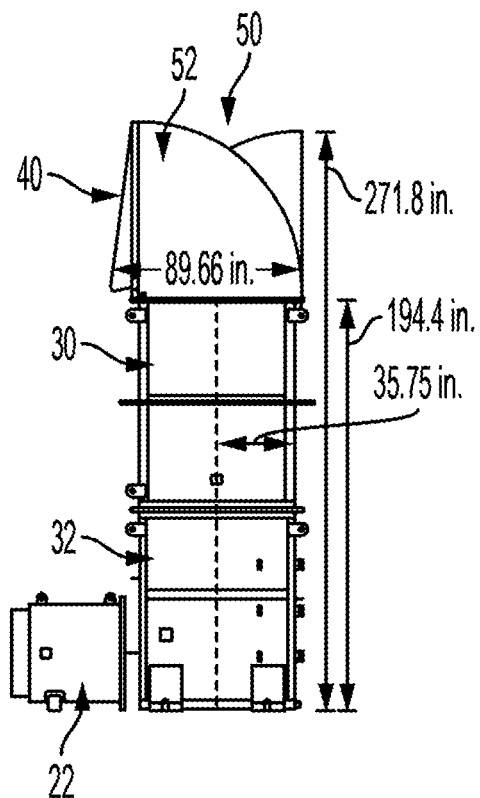
FIG. 2 illustrates an example exhaust attenuation system configured to receive exhaust gas from a gas turbine, the exhaust attenuation system including a lower elongated plenum configured to receive exhaust gas from the gas turbine and an upper noise attenuation system that is movably connected relative to the distal end of the lower elongated plenum, the upper noise attenuation system being shown in the extended operative position according to an embodiment of the disclosure.
Figure 3:
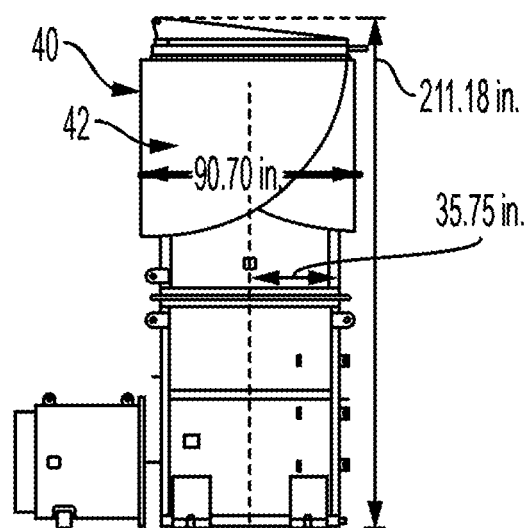
FIG. 3 illustrates an example exhaust attenuation system configured to receive exhaust gas from a gas turbine, the exhaust attenuation system including a lower elongated plenum configured to receive exhaust gas from the gas turbine and an upper noise attenuation system that is movably connected relative to the distal end of the lower elongated plenum, the upper noise attenuation system being shown in the stowed position according to an embodiment of the disclosure.
Figure 4:
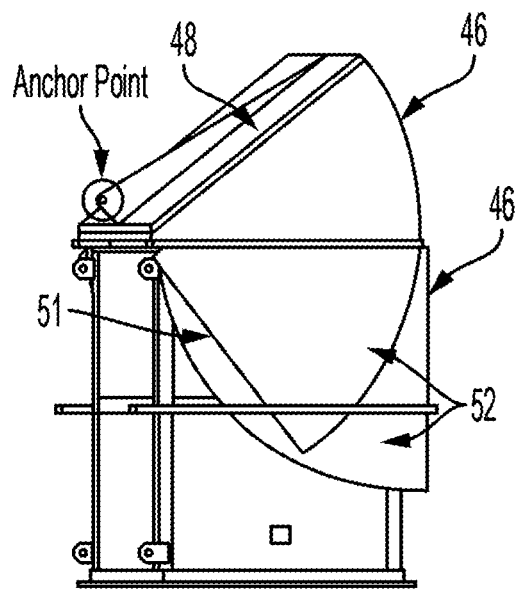
FIG. 4 shows an example exhaust attenuation system illustrating an upper noise attenuation system having a pair of opposed silencer hoods that are configured to be hingeably mounted to portions of the distal end of the lower elongated plenum and that are independently movable relative to each other according to an embodiment of the disclosure.
Figure 5:
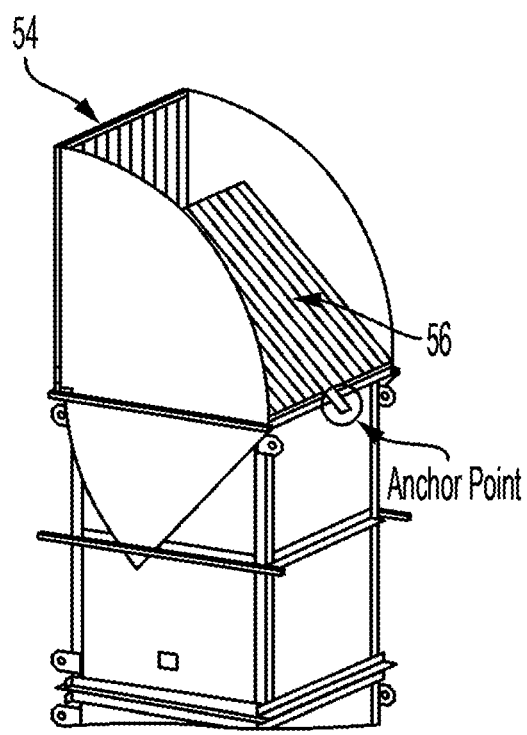
FIG. 5 shows an example lower silencer hood being moved to the operative position and shows an example upper silencer hood positioned in the operative position according to an embodiment of the disclosure.
Figure 8:
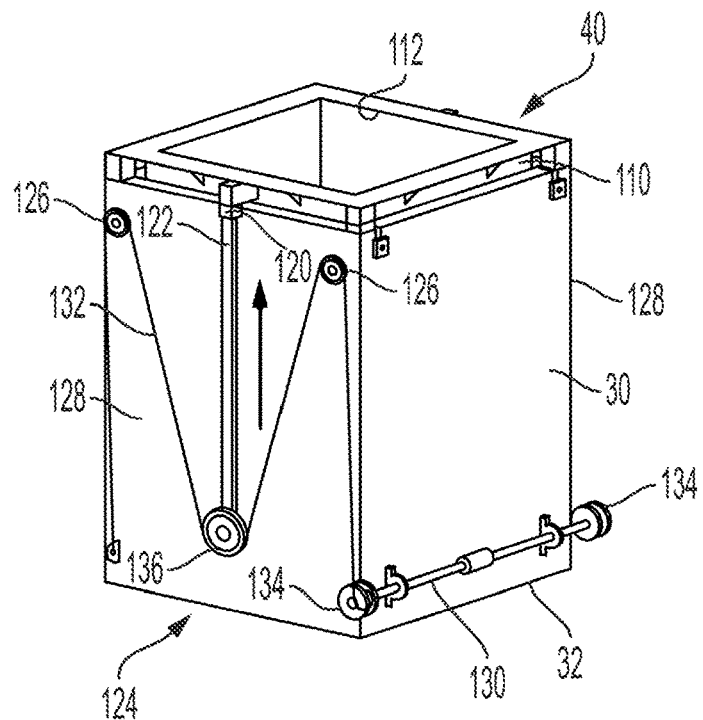
FIG. 8 shows an example upper noise attenuation system having an elongated conduit that has an exterior that is shaped and sized for complementary receipt therein the distal portion of the lower elongated plenum and showing the elongated conduit in the stored position according to an embodiment of the disclosure.
Figure 9:
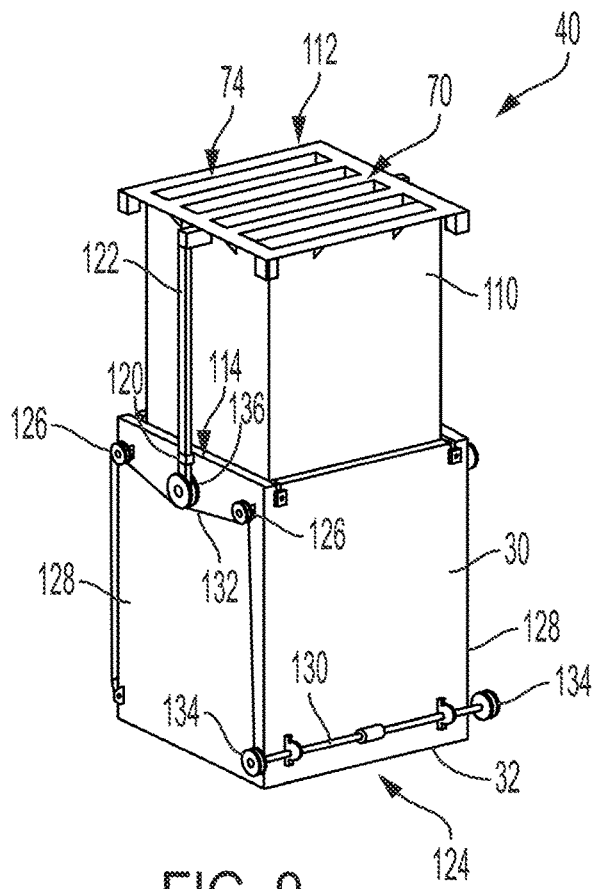
FIG. 9 shows an example upper noise attenuation system having an elongated conduit that has an exterior that is shaped and sized for complementary receipt therein the distal portion of the lower elongated plenum and showing the elongated conduit in the operative position according to an embodiment of the disclosure.
Figure 10:
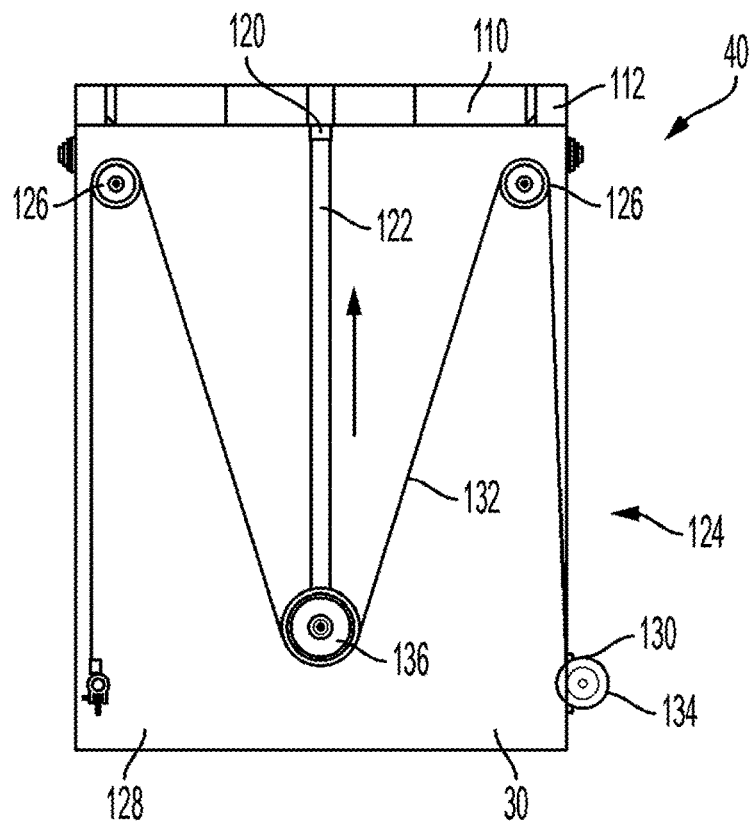
FIG. 10 shows an example guide mounted to an exterior surface of the lower elongated plenum, a rod configured for operative slideable receipt therein the slot of the guide, and means for selective axial movement of the rod for movement of the elongated conduit between the stowed position and the operative position according to an embodiment of the disclosure.

Referring now to the drawings in which like numerals indicate like parts throughout the several views, the following description is provided as an enabling teaching of exemplary embodiments, and those skilled in the relevant art will recognize that many changes may be made to the embodiments described. It also will be apparent that some of the desired benefits of the embodiments described may be obtained by selecting some of the features of the embodiments without utilizing other features. Accordingly, those skilled in the art will recognize that many modifications and adaptations to the embodiments described are possible and may even be desirable in certain circumstances, and are a part of the disclosure. Thus, the following description is provided as illustrative of the principles of the embodiments and not in limitation thereof.

The phraseology and terminology used herein is for the purpose of description and should not be regarded as limiting. As used herein, the term "plurality" refers to two or more items or components. The terms "comprising," "including," "carrying," "having," "containing," and "involving," whether in the written description or the claims and the like, are open-ended terms, i.e., to mean "including but not limited to." Thus, the use of such terms is meant to encompass the items listed thereafter, and equivalents thereof, as well as additional items. Only the transitional phrases "consisting of" and "consisting essentially of," are closed or semi-closed transitional phrases, respectively, with respect to any claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish claim elements.

As used herein, the term "trailer" refers to any transportation assembly, including, but not limited to, a transport, truck, skid, and/or barge used to transport relatively heavy structures, such as fracturing equipment.

As used herein, the term "directly driven turbine" DDT refers to both the gas turbine and the mechanical energy transport sections of a directly driven turbine fracturing unit.

The gas turbine receives hydrocarbon fuel, such as natural gas, and converts the hydrocarbon fuel into mechanical energy that is mechanically transferred via a gearbox to at least one fluid pump. It is further contemplated that a gas turbine as described herein may be a gas fueled turbine, a dual-fuel turbine, and the like.

In one embodiment, a mobile fracking system 10 may include a trailer 12, a gas turbine 14, and an exhaust attenuation system 20 configured to receive exhaust gas from the gas turbine. FIG. 1 is a schematic diagram of an embodiment of a mobile fracking system 10 showing the trailer 12 having a rear end, a front end, a bottom end, and a top end that defines an interior space. As shown, the gas turbine 14 is housed inside the trailer in the interior space. To improve mobility over a variety of roadways, the trailer may have a maximum height, a maximum width, and a maximum length that would be suitable for passage on conventional roads and expressways. Further, the trailer may comprise at least three axles used to support and distribute the weight on trailer. Other embodiments of the trailer may exceed three axles depending on the total transport weight and it is contemplated that the dimensions and the number of axles may be adjusted to allow for the transport over roadways that typically mandate certain height, length, and weight restrictions.

The trailer 12 may house at least one or more of the following equipment: (1) an inlet plenum; (2) the gas turbine 14; (3) the exhaust attenuation system 20 to remove exhaust gas from gas turbine into the atmosphere, (4) a gearbox and/or transmission 16 connected to a rotary output of the gas turbine, and (5) a fluid pump 18 operatively connected to the output of the gearbox. Other components not shown in FIG. 1, but which may also be located on the trailer include a control system, a turbine lube oil system, and a fire suppression system. The turbine lube oil system may be configured to selectively operate turbine lube oil filtering and cooling systems. In one embodiment, the fire suppression system may also comprise sprinklers, water mist, clean agent, foam sprinkler, carbon dioxide, and/or other equipment used to suppress a fire or provide fire protection for the gas turbine. Mounting of the turbine lube oil systems and the fire suppression system onto the DDT fracturing unit reduces trailer operative footprint by eliminating the need for an auxiliary transport and connections for the turbine and generator lube oil, filtering, cooling systems and the fire suppression system to the gas turbine generator transport.

One skilled in the art will appreciate that the gas turbine 14 may be configured to generate mechanical energy (i.e., rotation of a shaft) from a hydrocarbon fuel source, such as natural gas, liquefied natural gas, condensate, and/or other liquid fuels. As schematically illustrated, the gas turbine shaft is connected to the gearbox such that the gearbox converts the supplied mechanical energy from the rotation of the gas turbine shaft to a downstream shaft assembly that is rotated at a desired speed and torque to the downstream mechanically connected fluid pump. The gas turbine may be a gas turbine, such as the GE family of gas turbines, the Pratt and Whitney family of gas turbines, or any other gas turbine and/or dual-fuel turbine that generates sufficient mechanical power for the production of the desired level of brake horsepower to the downstream fluid pump for fracking operations at one or more well sites.

The trailer 12 may also comprise gas turbine inlet filter(s) configured to provide ventilation air and combustion air via one or more inlet plenums (not shown) to the gas turbine. Additionally, enclosure ventilation inlets may be added to increase the amount of ventilation air, which may be used to cool the gas turbine and ventilate the gas turbine enclosure. The combustion air may be the air that is supplied to the gas turbine to aid in the production of mechanical energy. The inlet plenum may be configured to collect the intake air from the gas turbine inlet filter and supply the intake air to the gas turbine.

In one embodiment and referring to FIGS. 2-11, the exhaust attenuation system 20 may be attached to a portion of the trailer and may include a lower elongated plenum 30 and an upper noise attenuation system 40 that is movably connected relative to the distal end of the lower elongated plenum. The lower elongated plenum 30 has a proximal end and a distal end and extends a first distance between the respective proximal and distal ends. The lower elongated plenum 30 defines an inlet 32 adjacent the proximal end of the lower elongated plenum 30 that is configured to receive exhaust gas from the gas turbine. In one aspect, the lower elongated plenum extends longitudinally away from a bottom surface of the trailer about an exhaust axis. The exhaust axis may be positioned at an angle relative to the bottom surface and, in one non-limiting example, may be substantially normal to the bottom surface, substantially vertical, and/or substantially upright.

It is contemplated that the exhaust attenuation system 20 will be constructed of materials that are capable of withstanding extreme temperatures, such as for example and without limitation, to about 1250° F. (676° C.), that are associated with exhaust gases exiting gas turbines.

In embodiments, the upper noise attenuation system 40 may be configured to be selectively movable between a stowed position and an operative, upright, position. In the stowed position, an outlet end portion 42 of the upper noise attenuation system is positioned proximate to the distal end of the lower elongated plenum, and, in the operative position, the upper noise attenuation system defines an upper elongated plenum 50 that is in fluid communication with the distal end of the lower elongated plenum. In this operative position, an outlet 52 of the upper noise elongated plenum is spaced away from the distal end of the lower elongated plenum at a second distance that is greater than the first distance. Further, it is contemplated that the upper noise attenuation system, in the operative position, may extend longitudinally away from the distal end of the lower elongated plenum about the exhaust axis.

The mobile fracking system affects a reduction in sound emission by increasing the effective length of the gas turbine exhaust stack. Attenuation of rectangular duct in the 63 Hz to 250 Hz octave frequency bands may be expressed as:

$$\Delta L_{duct} = 17.0 \left(\frac{P}{S}\right)^{-.025} f^{-0.85} l \quad (1)$$

$$\Delta L_{duct} = 1.64 \left(\frac{P}{S}\right)^{-0.73} f^{-0.58} l \quad (2)$$

TABLE 1

Exhaust attenuation with unlined rectangular duct

| Exhaust Reference | | Exhaust Duct | | Exhaust Duct with Proposed System $\Delta L_{duct, N}$ – | | |
|---|---|---|---|---|---|---|
| PWL dB | f Hz | $\Delta L_{duct, O}$ dB | PWL dB | $\Delta L_{duct, N}$ dB | $\Delta L_{duct, O}$ dB | PWL dB |
| 120.0 | 63.5 | 2.90 | 116.1 | 4.06 | 1.16 | 114.9 |
| 129.0 | 125 | 1.96 | 127.0 | 2.74 | 0.78 | 126.2 |
| 127.0 | 250 | 1.31 | 125.7 | 1.83 | 0.52 | 125.2 |
| 127.0 | 500 | 0.88 | 126.1 | 1.23 | 0.35 | 125.8 |
| 126.0 | 1000 | 0.59 | 125.4 | 0.82 | 0.23 | 125.2 |
| 130.0 | 2000 | 0.39 | 129.6 | 0.55 | 0.16 | 129.4 |

For example, and without limitation, and taken from Table 1 above, proposed exhaust system may affect a 40% increase in sound attenuation and a maximum in 1.2 dB in sound pressure by selective operative increase in the elongate length of the exhaust plenum from 16.1 ft. to 22.6 ft.

In embodiments, the mobile fracking system 10 may include a first plenum 22 configured to receive exhaust gas from the gas turbine. In this aspect, a first end of the first plenum is connected to, and in fluid communication with, an exhaust outlet of the gas turbine and a second end of the first plenum connected to, and in fluid communication with, the inlet of the lower elongated plenum. For example, the gas turbine may be mounted to or otherwise supported thereon the bottom surface of the trailer and the first plenum may extend longitudinally substantially parallel to the bottom surface.

Optionally, the upper noise attenuation system 40 may include at least one array of baffles 70 that are configured to attenuate noise. The array of baffles 70 may include a plurality of baffles 72 that are distributed parallel to a common axis and that define a plurality of slots 74 defined by and between the plurality of baffles. In one exemplary aspect, the at least one array of baffles 70 may be mounted therein a portion of the upper elongated plenum in communication with the exhaust gas passing therethrough the upper elongated plenum to the outlet to supplement the noise dampening capabilities of the noise attenuation system.

In embodiments and referring to FIGS. 2-7, the upper noise attenuation system 40 may include a pair of opposed and cooperating silencer hoods 46. In this aspect, each silencer hood 46 may have a planer surface 48 having opposed side edges 50 and a pair of opposing side surfaces 52 that extend outwardly from portions of the respective side edges of the planer surface. Each silencer hood 46 may be configured to be hingeably mounted to portions of a distal end of the lower elongated plenum such that, in the operative position, the pair of opposed silencer hoods are positioned substantially upright so that the planer surfaces of the respective back edges are in parallel opposition and that the respective side surface are also in parallel opposition to form the elongated upper elongated plenum.

As exemplarily shown in the figures, the pair of opposed silencer hoods 46 may include an upper silencer hood 54 and a lower silencer hood 56 that are configured to cooperatively slideably engage relative to each other when moving therebetween the stowed position and the operative position. In this example, the respective opposed upper and lower silencer hoods may be opened in a sequential manner. First, the upper silencer hood may be raised independently from the lower silencer hood. As shown, an anchor point mounted on a back surface of the planar surface of the upper silencer hood proximate a bottom edge of the back surface may be connected to a wire that is operative connected to a spooling system that is configured for selective movement of the connected silencer hood between the stowed and operative positions. In operation, the spooling system is operated to open or otherwise urge the upper silencer hood to the operative position and may comprise a winch, such as, for example and without limitation, an electric winch, a hydraulic winch, a pneumatic winch, and the like. It is contemplated that, once the upper silencer hood is in the operative position, tension may be maintained on the wire to aid in maintaining the upper silencer hood in the operative position until the upper silencer hood is lowered to the stowed position for transport. Optionally, a mechanical limit switch on the spooling system that may be configured to determine distance the wire is required to move to open and close the respective silencer hoods 46.

Similarly, the lower silencer hood 56 may be raised independently from the upper silencer hood 54. As shown, an anchor point mounted on a back surface of the planar surface of the lower silencer hood proximate a bottom edge of the back surface may be connected to a wire that is operative connected to the spooling system. In operation, after the upper silencer hood is positioned in the operative position, the spooling system of the lower silencer hood may be operated to open or otherwise urge the lower silencer hood to the operative position. It is contemplated that, once the lower silencer hood is in the operative position, tension may be maintained on the wire to aid in maintaining the lower silencer hood in the operative position until the lower silencer hood is lowered to the stowed position for transport. In this example, the lower silencer hood would be lowered first in sequence when the respective opposed upper and lower silencer hoods are closed or otherwise moved to the stowed position.

As noted above, the respective upper and lower silencer hoods 54, 56 may be maneuvered to and about the operative and the stowed positions through the use of one or more actuators, such as linear actuators and/or rotary actuators, and in some embodiments, one or more cables and/or one or more mechanical linkages. In some embodiments, the one or more actuators may be electrically-actuated, pneumatically-actuated, and/or hydraulically-actuated (e.g., via hydraulic cylinders and/or hydraulic motors). For example, the respective upper and lower silencer hoods 54, 56 may be maneuvered to and about the operative and the stowed positions through the use of a spooling system comprising electrical, mechanical, and/or pneumatic winches that contain spooled wire that are connected to the anchor points strategically positioned on the respective upper and lower silencer hoods 54, 56.

Optionally, the exhaust attenuation system shown in FIGS. 2-5, 6A, 6B, and 7 may further include a retention brace system 90. In this aspect, the retention brace system may include a first pair of opposing retention braces 92 and a second pair of opposing retention braces 99. The first pair of opposing retention braces 92 may include a first brace 93 mounted to exterior portions of the distal end of the lower elongated plenum and a second brace 94 mounted to an opposed exterior portions of the distal end of the lower elongated plenum. Each brace of the first pair of opposing retention braces includes a bar 95 that extends between a first end mount 96 and an opposing second end mount 97 such that, when the respective first and second end mounts are positioned therein the lower elongated plenum, the bar is spaced from an exterior surface of the distal end of the lower elongated plenum and defines a slot 98 that is sized and shaped for receipt of portions of respective side surfaces of the pair of silencer hoods.

Similarly, the second pair of opposing retention braces 99 includes a third brace 100 spaced proximally from the first brace and mounted to exterior portions the lower elongated plenum and a fourth brace 102 spaced proximally from the first brace and mounted to an opposed exterior portions of the lower elongated plenum. In this aspect, each brace of the second pair of opposing retention braces includes a bar 95 extending between a first end mount 96 and an opposing second end mount 97 such that, when the respective first and second end mounts are positioned therein the lower elongated plenum, the bar is spaced from an exterior surface of the lower elongated plenum and defines a slot 98 that is sized and shaped for receipt of respective side surfaces of the pair of silencer hoods when the pair of silencer hoods is positioned in the stowed position.

In embodiments, the upper noise attenuation system 40 may include at least one array of baffles configured to attenuate noise that is mounted therein at least a portion of the planer surface of at least one or in each of the opposed silencer hoods.

In other embodiments and referring to FIGS. 8-11, the upper noise attenuation system 40 may optionally include an elongated conduit 110 that has an exterior surface shape that is shaped and sized for complementary receipt therein a distal portion of the lower elongated plenum 30. In this aspect, in the stowed position, the elongated conduit 110 is positioned substantially therein the lower elongated plenum such that an outlet end 112 of the elongated conduit is positioned proximate to the distal end of the lower elongated plenum. In the operative position, the elongated conduit 110 is selectively movable about and along an about an exhaust axis outwardly away from the distal end of the lower elongated plenum such that a proximal end 114 of the elongated conduit is positioned proximate the distal end of the lower elongated plenum and the outlet end 112 of the elongated conduit forms the outlet of the upper elongated plenum.

In this aspect, to operatively move or otherwise urge the elongated conduit 110 about and between the stowed and operative positions, the upper noise attenuation system 40 may include at least one guide 120 mounted to an exterior surface (e.g., at an upper end thereof) of the lower elongated plenum 30. As will be appreciated, the guide 120 may define an elongated enclosed slot extending parallel to the exhaust axis. A rod 122 having a distal end mounted to an outermost edge surface of the outlet end 112 of the elongated conduit 110 may be provided that is configured for operative slideably receipt therein the slot of the guide 120. To operatively move the rod 122 and thereby move the elongated conduit 110 relative to the lower elongated plenum 30, a means for selective axial movement of the rod 122 and thus for movement of the elongated conduit 110 may be provided for selective movement of the elongated conduit 110 between the stowed position (see, e.g., FIGS. 8 and 10) and the operative position (see, e.g., FIG. 9).

Figure 11:
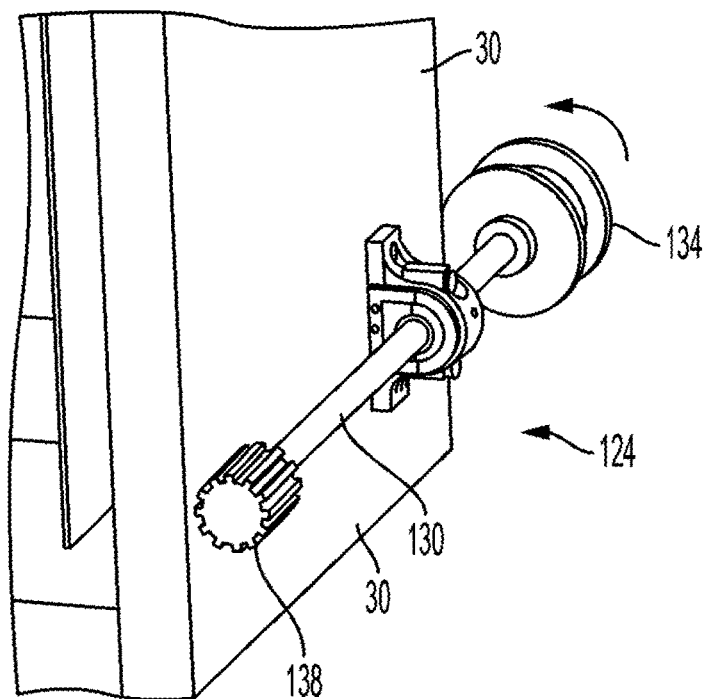
FIG. 11 schematically illustrates portions of a means for selective axial movement of the rod for movement of the elongated conduit between the stowed position and the operative position according to an embodiment of the disclosure.

As illustrated in FIGS. 8-11, selective axial movement of the rod 122 may be provided by an extension assembly 124. In some examples, the extension assembly 124 may include pairs of pulleys 126 connected to opposing sides 128 of the lower elongated plenum 30, and a drive shaft 130 coupled to the lower elongated plenum 30. The extension assembly 124 may also include a pair of cables 132, each of which is anchored to a lower end of the lower elongated plenum 30. A pair of drive wheels 134 may be connected to each end of the drive shaft 130, and each of the drive wheels 134 may be configured to retract or extend a respective one of the pair of cables 132, for example, such that retraction of the pair of cables 132 causes the rod 122 to push the elongated conduit 110 to extend from the lower elongated plenum 30 and into the operative position (see FIG. 9), and extension of the pair of cables 132 causes the rod 122 to return to a lowered position, thereby allowing the elongated conduit 110 to return to the stowed position (see FIGS. 8 and 10). In some examples, at ends of the respective rods 122 remote from the outlet end 112 of the elongated conduit 110, a rod pulley 136 may be provided for engaging a respective cable 132 to facilitate movement of the elongated conduit 110 relative to the lower elongated plenum 30. As shown in FIG. 11, in some examples, a drive gear 138 may be connected to the drive shaft 130 to facilitate rotation of the drive shaft 130 via an actuator including a mating gear, such as a linear actuator and/or a rotary actuator, for example, a gear shaft and a prime mover such as, for example, and without limitation, a winch. As one skilled in the art will appreciate, when such a prime mover is activated, the illustrated drive gear 138 of the drive shaft 130 rotates, which causes the complementary rotation of the drive wheels 134 connected to the respective ends of the drive shaft 130. In turn, the cables 132 will spool onto each of the drive wheels 134 and via the pulleys 126, will affect the translation of the proximal end of the respective rods 122 to extend the elongated conduit 110 into the operative position.

In this embodiment, the upper noise attenuation system may include at least one array of baffles configured to attenuate noise that may be mounted therein an outlet end of the elongated conduit.

It is contemplated that the means for selective axial movement of the rod for selective movement of the elongated conduit 110 between the stowed position and the operative position of the elongated conduit 110 may comprise one or more actuators, such as linear actuators and/or rotary actuators, and in some embodiments, one or more cables and/or one or more mechanical linkages. In some embodiments, the one or more actuators may be electrically-actuated, pneumatically-actuated, and/or hydraulically-actuated (e.g., via hydraulic cylinders and/or hydraulic motors). For example, selective movement of the elongated conduit 110 between the stowed position and the operative position of the elongated conduit 110 may be provided by the spooling system described above. In this aspect, the spooling system may comprise electrical, mechanical, and/or pneumatic winches that contain spooled wire and that are configured to spool wire onto each drum via the pulleys to affect the axial movement of the rod.

Optionally, the exhaust attenuation system 20 may further comprise a supervisory control system that is configured to utilize a series of digital input and output signals that will result in the controlled operation of the upper noise attenuation system 40. In this aspect, the exhaust attenuation system 20 may comprise a plurality of positional feedback sensors in communication with the supervisory control system. The positional feedback sensors are operatively mounted to respective portions of the upper noise attenuation system 40 such that the sensors may actuate when the upper noise attenuation system 40 is positioned in the stowed position and when in the operative, upright, position.

Each positional feedback sensor may comprise, for example and without limitation, a digital proximity switch that is configured to actuate when the positional feedback sensor's electromagnetic detection field comes in contact with a portion of the metallic surface of the exhaust stack. Upon actuation, each digital proximity switch is configured to send a digital signal to the supervisory control system indicative of the position of the respective upper and lower silencer hoods 54, 56 or, optionally, the respective position of the elongated conduit 110 relative to the distal end of the lower elongated plenum.

Optionally, it is contemplated that the positional feedback sensor may be an analog position sensor that is configured to provide positional feedback to the supervisory control system of the positions of the respective upper and lower silencer hoods 54, 56 or, optionally, the respective position of the elongated conduit 110 relative to the distal end of the lower elongated plenum. In this exemplary aspect, the analog position sensor may be configured to transmit a scaled current or voltage signal that depending on the value allows the control system to identify the accurate position of the upper noise attenuation system 40. An exemplary analog position sensor, such as a Sick absolute encoder, models AFS/AFM60 SSI, would be suitable for this application.

The positional feedback sensors allow the operator to know the position of the respective upper and lower silencer hoods 54, 56 or, optionally, the respective position of the elongated conduit 110 relative to the distal end of the lower elongated plenum and to further allow for the protection of equipment on the gas turbine skid. For example, the supervisory control system may generate an interlock signal that would prohibit the ignition of the gas turbine engine upon receipt of a signal from the respective positional feedback sensors that indicates that the upper noise attenuation system 40 is in the closed position. Thus, the interlock signal preventing turbine operation into a sealed cavity prevents the possibility of serious damage to the turbine engine due to undesired backpressure.

In operational aspects, it is contemplated that the upper noise attenuation system 40 may be actuated to move between the stowed and operative positions by manual operation of a physical lever. In this aspect, and if the spooling system includes a pneumatic winch, the selective actuation of the manual level may allow for the flow of air to the pneumatic motor resulting in rotary motion at the winch. Optionally, if the spooling system includes a hydraulic winch, the selective actuation of the manual level may allow for the flow of hydraulic oil into the stator of the hydraulic motor to produce the desired rotary motion and torque to actuate the upper noise attenuation system 40. In a further, exemplary aspect, if the spooling system includes an electrical winch, a switching device may be provided that is configured to allow for the selective application of current to the electric winch motor. The switching device may exemplarily be in the form of a toggle switch that allows the electrical circuit to the motor to be completed upon actuation such that the electric motor performs the desired rotary motion.

In a further optional aspect, the supervisory control system of the exhaust attenuation system 20 may comprise a SCADA (supervisory control and data acquisition) system. Exemplarily, if pneumatic and/or hydraulic winches are used, a directional control valve with an electrical coil may be positioned between the respective pressurized sources of air or oil and the downstream pneumatic or hydraulic motors. Operationally, an operation signal transmitted or outputted to the directional control valve from the SCADA system upon operator input. In this aspect, the operation signal could be a PWM signal with reverse polarity. For example, when the operator pushes an input on a human machine interface, which is identified by the programmable logistical controller, and the necessary output operation signal is sent to the directional control valve that allows for proportional flow of the required air or oil media to the winch motor. Optionally, this methodology may also be used for an electrical winch but, in this aspect, the output operation signal would energize a relay that allows for low voltage, high current power to reach the electrical motor and perform the proportional operation function. It is contemplated that these actuation functions may be made fully autonomous by implementing a start-up sequence such that, when the operator selects to start the unit, a series of sequenced signal outputs are driven around the frac pump trailer that will verify that the exhaust attenuation system 20 is in the open, operative position, the auxiliary power is verified to be on line, the necessary safety and communication checks performed, and then the gas turbine is allowed to start. In this exemplary aspect, a single input to actuate the exhaust attenuation system 20 to move to the open, operative position may initiate the issuance of a series of outputs from the SCADA system, which may save the operator time and may reduce complexity of how to individually perform these sequential outputs.

This application is a continuation of U.S. Non-Provisional application Ser. No. 17/498,916, filed Oct. 12, 2021, titled "TURBINE ENGINE EXHAUST DUCT SYSTEM AND METHODS FOR NOISE DAMPENING AND ATTENUATION," which is a continuation of U.S. Non-Provisional application Ser. No. 17/182,325, filed Feb. 23, 2021, titled "TURBINE ENGINE EXHAUST DUCT SYSTEM AND METHODS FOR NOISE DAMPENING AND ATTENUATION," which is a continuation of U.S. Non-Provisional application Ser. No. 16/948,290, filed Sep. 11, 2020, titled "TURBINE ENGINE EXHAUST DUCT SYSTEM AND METHODS FOR NOISE DAMPENING AND ATTENUATION," now U.S. Pat. No. 10,961,914, issued Mar. 30, 2021, which claims priority to and the benefit of, U.S. Provisional Application No. 62/704,567, filed May 15, 2020, titled "TURBINE ENGINE EXHAUST DUCT SYSTEM FOR NOISE DAMPENING AND ATTENUATION," and U.S. Provisional Application No. 62/899,957, filed Sep. 13, 2019, titled "TURBINE ENGINE EXHAUST DUCT SYSTEM FOR NOISE DAMPENING AND ATTENUATION," the disclosures of which are incorporated herein by reference in their entireties.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims.

What is claimed:

1. A method to attenuate noise associated with operation of a gas turbine engine during a fracturing operation, the method comprising:
    connecting an inlet of a first elongated plenum to an exhaust duct of the gas turbine engine to receive exhaust gas via the exhaust duct;
    connecting a noise attenuator to a distal end of the first elongated plenum, the noise attenuator including a first silencer hood and a second silencer hood; and
    extending the noise attenuator from the distal end of the first elongated plenum to increase an effective length of the first elongated plenum and reduce sound emission associated with operation of the gas turbine engine by:
        pivoting the first silencer hood from a stowed position at least partially overlapping the second silencer hood in a stowed position to an operative position, the first silencer hood including a first surface, a first side surface connected to a first edge of the first surface and extending away from the first surface, and a second side surface connected to a second edge of the first surface opposite the first edge and extending away from the first surface; and
        pivoting the second silencer hood from the stowed position to an operative position so that the second silencer hood in combination with the first silencer hood define a second elongated plenum positioned to receive exhaust gas via the first elongated plenum.

2. The method of claim 1, wherein:
    the pivoting the first silencer hood from the stowed position to the operative position comprises activating a first actuator connected to the first elongated plenum and the first silencer hood; and
    the pivoting the second silencer hood from the stowed position to the operative position comprises activating a second actuator connected to the first elongated plenum and the second silencer hood.

3. The method of claim 2, wherein:
    the activating the first actuator comprises activating one or more of a first linear actuator or a first rotary actuator; and
    the activating the second actuator comprises activating one or more of a second linear actuator or a second rotary actuator.

4. The method of claim 2, wherein:
    the activating the first actuator comprises one of electrically activating the first actuator, pneumatically activating the first actuator, or hydraulically activating the first actuator; and
    the activating the second actuator comprises one of electrically activating the second actuator, pneumatically activating the second actuator, or hydraulically activating the second actuator.

5. The method of claim 1, wherein:
    the second silencer hood comprises a second surface, a third side surface, and a fourth side surface; and
    the pivoting the first silencer hood from the stowed position to the operative position and the pivoting the second silencer hood from the stowed position to the operative position comprises pivoting the first silencer hood and the second silencer hood, such that:
        the first surface defines a first wall of the second elongated plenum;
        the second surface defines a second wall of the second elongated plenum, the second wall opposing the first wall;
        the first side surface and the third side surface define a third wall of the second elongate plenum; and
        the second side surface and the fourth side surface define a fourth wall of the second elongated plenum, the third wall opposing the fourth wall.

6. The method of claim 5, wherein in the stowed position, the first surface and the second surface at least partially overlap one another proximate the distal end of the first elongated plenum.

7. The method of claim 1, further comprising:
    receiving, at a control system, one or more signals indicative of a position of one or more of the first silencer hood or the second silencer hood;
    determining, via the control system, based at least in part on the one or more signals, the position of the one or more of the first silencer hood or the second silencer hood; and controlling, via the control system, based at least in part on the position of the one or more of the first silencer hood or the second silencer hood, operation of the gas turbine engine.

8. The method of claim 7, wherein the controlling operation of the gas turbine engine comprises preventing ignition of the gas turbine engine when the one or more signals is indicative of the one or more of the first silencer hood or the second silencer hood not being in the operative position to prevent damage to the gas turbine engine.

9. A method to operate a mobile fracturing unit comprising a trailer, a gas turbine engine connected to the trailer, and a fluid pump connected to the gas turbine engine via a gearbox and to the trailer, the method comprising:
providing a first elongated plenum having an inlet connected to an exhaust duct of the gas turbine engine to receive exhaust gas via the exhaust duct during operation of the gas turbine engine;
providing a noise attenuator connected to a distal end of the first elongated plenum, the noise attenuator including a first silencer hood and a second silencer hood;
extending the noise attenuator from the distal end of the first elongated plenum to increase an effective length of the first elongated plenum by:
positioning the first silencer hood from a stowed position at least partially overlapping the second silencer hood in a stowed position to an operative position, the first silencer hood including a first surface, a first side surface connected to a first edge of the first surface and extending away from the first surface, and a second side surface connected to a second edge of the first surface opposite the first edge and extending away from the first surface; and
positioning the second silencer hood from the stowed position to an operative position so that the second silencer hood in combination with the first silencer hood define a second elongated plenum positioned to receive exhaust gas via the first elongated plenum; and
operating the gas turbine engine such that exhaust gas from operation of the gas turbine engine flows from the exhaust duct through the first elongated plenum and the second elongated plenum to reduce sound emission associated with operation of the gas turbine engine.

10. The method of claim 9, further comprising:
prior to the operating the gas turbine engine, receiving, at a control system, one or more signals indicative of a position of one or more of the first silencer hood or the second silencer hood;
determining, via the control system, based at least in part on the one or more signals, the position of the one or more of the first silencer hood or the second silencer hood; and
controlling, via the control system, based at least in part on the position of the one or more of the first silencer hood or the second silencer hood, operation of the gas turbine engine.

11. The method of claim 10, wherein the controlling operation of the gas turbine engine comprises preventing ignition of the gas turbine engine when the one or more signals is indicative of the one or more of the first silencer hood or the second silencer hood not being in the operative position to prevent damage to the gas turbine engine.

12. The method of claim 9, wherein the positioning the first silencer hood from the stowed position to the operative position comprises pivoting the first silencer hood from an at least partially overlapping position relative to the second silencer hood in the stowed position to the operative position.

13. The method of claim 9, wherein:
the positioning the first silencer hood from the stowed position to the operative position comprises activating a first actuator connected to the first elongated plenum and the first silencer hood; and
the positioning the second silencer hood from the stowed position to the operative position comprises activating a second actuator connected to the first elongated plenum and the second silencer hood.

14. The method of claim 13, wherein:
the activating the first actuator comprises activating one or more of a first linear actuator or a first rotary actuator; and
the activating the second actuator comprises activating one or more of a second linear actuator or a second rotary actuator.

15. The method of claim 13, wherein:
the activating the first actuator comprises one of electrically activating the first actuator, pneumatically activating the first actuator, or hydraulically activating the first actuator; and
the activating the second actuator comprises one of electrically activating the second actuator, pneumatically activating the second actuator, or hydraulically activating the second actuator.

16. The method of claim 9, wherein:
the second silencer hood comprises a second surface, a third side surface, and a fourth side surface; and
the positioning the first silencer hood from the stowed position to the operative position and the positioning the second silencer hood from the stowed position to the operative position comprises pivoting the first silencer hood and the second silencer hood, such that:
the first surface defines a first wall of the second elongated plenum;
the second surface defines a second wall of the second elongated plenum, the second wall opposing the first wall;
the first side surface and the third side surface define a third wall of the second elongated plenum; and
the second side surface and the fourth side surface define a fourth wall of the second elongated plenum, the fourth wall opposing the third wall.

17. The method of claim 16, wherein in the stowed position, the first surface and the second surface at least partially overlap one another proximate the distal end of the first elongated plenum.

18. A method to attenuate noise associated with operation of an engine during a fracturing operation, the method comprising:
connecting an inlet of a plenum to an exhaust duct of the engine to receive exhaust gas via the exhaust duct;
connecting a noise attenuator to a distal end of the plenum, the noise attenuator including a first silencer hood and a second silencer hood; and
extending the noise attenuator from the distal end of the plenum to increase an effective length of the plenum and reduce sound emission associated with operation of the engine by pivoting the first silencer hood and the second silencer hood from a stowed position to an operative position, the first silencer hood at least partially overlapping the second silencer hood in the stowed position, and the first silencer hood comprises a first surface, a first side surface connected to and extending away from the first surface, and a second side surface connected to and extending away from the first surface such that the second side surface opposes the first side surface across an outlet of the plenum at the distal end.

19. The method of claim 18,
wherein the second silencer hood comprises:
   a second surface;
   a third side surface connected to and extending away from the second surface; and
   a fourth side surface connected to and extending away from the second surface such that the fourth side surface opposes the third side surface across the outlet.

20. The method of claim 19, wherein the extending the noise attenuator from the distal end of the plenum comprises pivoting the first silencer hood and the second silencer hood from the stowed positions to the operative position such that:
   the first surface defines a first wall projected from the distal end;
   the second surface defines a second wall projected from the distal end, the second wall opposing the first wall across the outlet;
   the first side surface and the third side surface define a third wall projected from the distal end; and
   the second side surface and the fourth side surface define a fourth wall projected from the distal end, the fourth wall opposing the third wall across the outlet.

21. The method of claim 18, wherein pivoting the first silencer hood and the second silencer hood from the stowed position to the operative position comprises actuating one or more actuators connected to the plenum.

22. The method of claim 21, wherein at least one of the one or more actuators is selected from a group consisting of a linear actuator and a rotary actuator.

23. The method of claim 21, wherein:
   the actuating the one or more actuators comprises electrically actuating the one or more actuators, pneumatically actuating the one or more actuators, or hydraulically actuating the one or more actuators.

24. The method of claim 18, further comprising:
   receiving, at a control system, one or more signals indicative of a position of one or more of the first silencer hood or the second silencer hood;
   determining, via the control system, based at least in part on the one or more signals, the position of the one or more of the first silencer hood or the second silencer hood; and
   controlling, via the control system, based at least in part on the position of the one or more of the first silencer hood or the second silencer hood, operation of the engine.

25. The method of claim 24, wherein the engine comprises a gas turbine engine, and wherein the controlling operation of the engine comprises preventing ignition of the gas turbine engine when the one or more signals is indicative of the one or more of the first silencer hood or the second silencer hood not being in the operative position to prevent damage to the gas turbine engine.

* * * * *